United States Patent
Azar

(10) Patent No.: US 8,121,886 B2
(45) Date of Patent: Feb. 21, 2012

(54) CONFIDENCE BASED SELECTION FOR SURVEY SAMPLING

(75) Inventor: James R. Azar, Marietta, GA (US)

(73) Assignee: Ryma Technology Solutions Inc., Montreal, Quebec (CA)

(*) Notice: Subject to any disclaimer, the term of this patent is extended or adjusted under 35 U.S.C. 154(b) by 1964 days.

(21) Appl. No.: 10/904,913

(22) Filed: Dec. 3, 2004

(65) Prior Publication Data
US 2006/0121434 A1 Jun. 8, 2006

(51) Int. Cl.
*G06Q 10/00* (2006.01)
(52) U.S. Cl. ....... 705/7.32; 705/26.7; 705/347; 434/323
(58) Field of Classification Search ............. 705/10, 705/12, 26, 7.11, 7.12, 7.29, 7.32, 26.7, 347; 434/323
See application file for complete search history.

(56) References Cited

U.S. PATENT DOCUMENTS

| | | | |
|---|---|---|---|
| 6,064,980 A * | 5/2000 | Jacobi et al. ............ 705/26 |
| 6,321,221 B1 * | 11/2001 | Bieganski .............. 707/5 |
| 6,421,724 B1 | 7/2002 | Nickerson et al. |
| 6,484,148 B1 * | 11/2002 | Boyd .............. 705/14.64 |
| 6,606,581 B1 | 8/2003 | Crofoot et al. |
| 6,928,392 B2 | 8/2005 | Nickerson et al. |

\* cited by examiner

*Primary Examiner* — Xuan Thai
*Assistant Examiner* — Timothy A Musselman
(74) *Attorney, Agent, or Firm* — Morris, Manning & Martin, LLP; John R. Harris

(57) ABSTRACT

A system and method for confidence-based selection of items for use in conducting a computer-implemented survey. The survey presents information about a selected plurality of items to a survey participant, to elicit survey feedback information. Information regarding the plurality of items is stored, the stored information including display information about each of the plurality of items for presentation to a survey participant. A subset of items for presentation to a survey participant is selected in accordance with a predetermined selection algorithm. Information corresponding to the selected subset of items is displayed to the survey participant via a survey user interface. Rating information is input by the survey participant via the survey user interface indicating the survey participant's preferences as to items in the presented subset of items. The rating information is utilized in various manners to affect the selection algorithm for a subsequent survey.

49 Claims, 12 Drawing Sheets

300 orasi

Product X Survey

310

. Please enter your ideas for Product X here:

Submit New Idea    Clear

2. Please rate the follow items according to importance.
Where 1 = not important at all, 100 = extremely important

| | |
|---|---|
| We need a Korean version | 0 — 100 |
| We need a Chinese version | 0 — 100 |
| Make comments anonymous | 0 — 100 |
| Use SSL for the entire survey | 0 — 100 |
| Generate longer passwords for users, at least 8 characters | 0 — 100 |

320    330

Save and Exit

FIG. 3

CONFIDENCE BASED SELECTION FOR SURVEY SAMPLING

FIELD OF THE INVENTION

This invention relates to a computer implementation of algorithms and methods for collecting and ranking ideas, people, or any other items. This invention further relates to use of a survey-like mechanism to obtain a prioritized or ranked list of items. The mechanism may be implemented using a network, such as the Internet.

BACKGROUND

Many entities, including those that conduct business over the Internet, find it beneficial to conduct surveys to determine what products should be offered, what services should be made available, what content should be present on a website, and so forth. Such surveys may be presented to a user after a transaction, such as the purchase of a product. Alternatively, the survey may be presented to a user independent of any particular transaction. Existing survey systems use a variety of delivery mechanisms including email invitations, banner adds, popup windows, and links on websites. The layout and presentation of the survey questions may be customized by the author of the survey to the extent allowable by the electronic survey system.

Typical survey systems allow the survey participant to respond via email, website, web application, web applet, or a client specifically designed to accept, transmit, or store the responses. The responses may take on a variety of forms including, but not limited to, single choice, multiple choice, rating scale, and text responses. Electronic survey systems typically gather the responses in a database or other electronic storage mechanism. The response data often becomes the subject matter for various reports, graphs, charts, and analysis. The reporting analysis tools are often separate from the actual survey systems themselves.

Various survey systems are presently available that allow electronic surveys to be authored and transmitted over the Internet. The existing systems use a variety of participation models. Some of the systems use an invitation-based system, in which an invitation is sent to the participant via email or other form of electronic message. The email invitations may or may not contain information to identify the person invited to the survey. Some systems use an open model that allows any visitor to a website to follow a link and respond to an electronic survey without ever identifying himself. There is also a self-registration model, where the participants identify themselves during a registration process before taking the survey.

There are several challenges associated with the use of surveys to gather information. It has been established that response rates to surveys typically decline as the amount of time required to respond increases. If the survey is too long or time-consuming, the user may not complete the survey. At the same time, the number of respondents is often a critical factor in the accuracy of a survey. The survey may not be effective if too few questions are asked of the user. Further, the questions and answer choices are predetermined by the author prior to the survey being made available for participants to respond. Thus, additional ideas of the user may not be captured.

Various efforts have been made to address these challenges. For example, to minimize the number of questions asked, some presently available electronic survey systems enable the author of the survey to specify the presentation order and skip certain survey questions based on the answers to previous questions. But even in such systems, the author of the survey writes all of the questions and answer choices.

Another way to reduce the length of the survey is to show the participant only a subset of the entire list of possible questions. There is one known company who offers the ability to show a participant a subset of the entire list. Informative, Inc. (Brisbane, Calif.) offers a product that allows a participant to select a subset of items from a larger list (that is a subset of all available items), and then arrange the subset into order according to the participant's preference.

Such systems are based on the premise that items that are receiving high rankings from respondents should be presented more often than items that are receiving low rankings. These systems consider a data collection effort to be either mature or immature, depending on the number of responses. This maturity status applies to the entire set of items. When the data collection effort is in the immature state, the items are presented to the respondents at random. When a sufficient number of responses is collected and the data collection is considered mature, the selection process shifts to selecting items with higher rankings to present to subsequent respondents. While this may be appropriate in some instances, it is limited in applicability and does not consider some other important factors that can be used to select a sample.

Some electronic survey systems have attempted to gather new items from a population of participants by enabling the participant to enter a text answer. However, to enable rapid processing of the survey results, such questions are typically limited in number, which places an artificial limitation on the number of items any one participant can submit. Furthermore, the items that are input are often deposited in a database with little information about the importance of the items.

Thus, there remains a need for a process for ranking items, people, or any other items in a manner that encourages participation and achieves high response rates. There further remains a need for a system that is able to collect items from the user and incorporate such items such that the new items are available for ranking by other participants.

SUMMARY OF THE INVENTION

The present invention generally relates to a computer based system for estimating the preference of a list of items as perceived by a population of participants, even though each participant rates only a subset of the entire list of items available for presentation. Since complete data will not likely be available, and the participants who do respond will most likely not completely agree on which items are most important, the present invention uses statistical computations to use the data that is available to most accurately estimate the order of preference that best fits the entire population. The amount of data and the quality of the data actually collected determines how accurate the estimated order actually reflects the order of preference for the population.

The system of the present invention increases the number of participant responses by decreasing the amount of time required for each respondent to express his preferences. To do so, only a subset of the complete list of items is presented to each participant, so that each participant is more likely participate and provide data. By increasing participation, the data is less likely to be biased toward the preferences of a few of the participants.

The system of the present invention is focused in particular on selecting the subset of items to be presented to each person of the population. The items are selected in a manner that improves the confidence in the estimated order of preference of the entire set of items.

According to one aspect, the present invention is a method for conducting a computer-implemented survey relating to a plurality of items from a plurality of survey participants. The invention of this aspect comprises a number of steps that include storing information regarding the plurality of items, the stored information including display information about each of the plurality of items for presentation to a survey participant and presentation number information corresponding to the number of times a particular item has been previously shown to survey participants, selecting a subset of items for presenting to a survey participant in accordance with a predetermined selection algorithm that utilizes the presentation number information to influence the selection of items for the subset, presenting the display information corresponding to the selected subset of items is presented to the survey participant via a survey user interface, and receiving rating information input by the survey participant via the survey user interface indicating the survey participant's preferences as to items in the subset of items presented.

In accordance with this first aspect, the method may further include the step of utilizing the rating information input by the survey participant to affect the probability of selection of the items in the selected subset in a subsequent selection of a subset of items for presentation to a subsequent survey participant using the predetermined selection algorithm.

In further accordance with this first aspect, the predetermined selection algorithm utilizes an adjustment factor to cause items to be selected more or less often as a function of the rating information obtained by previous participants of a survey. Further still, the predetermined selection algorithm utilizes, at least in part, a random number selection of items in the plurality of items.

The plurality of items may include a predetermined duplication of items in a set of the plurality of items, with the number of duplications of particular items influenced by the rating information.

In further accordance with this first aspect, the predetermined selection algorithm is self-adjusting based on previous responses received during a previous survey of the plurality of items. The self-adjusting may be based on modifying the probability of selecting an item from the plurality of items, the modifying in turn based collection of new items input by survey participants and rating of new items in comparison of previously included items.

In further accordance with this first aspect, the predetermined selection algorithm is operative initially to randomly select items for the subset of items, and thereafter operative to select items based on utilization of the rating information. The probability of selection of a given item may be continuously adjusted as items are rated by survey participants.

In accordance with a second aspect of the invention, the present invention is another method for conducting a computer-implemented survey relating to a plurality of items from a plurality of survey participants. The invention of this aspect comprises a number of steps that include storing information regarding the plurality of items in a memory, the stored information including display information about each of the plurality of items for presentation to a survey participant and frequency information corresponding to the number of times a particular item has been previously shown to survey participants. The method further includes the step of selecting a subset of items for presenting to a survey participant in accordance with a predetermined selection algorithm that utilizes the frequency information. The method further includes the step of presenting the display information corresponding to the selected subset of items to the survey participant via a survey user interface. The method further includes the step of receiving rating information input by the survey participant via the survey user interface indicating the survey participant's preferences as to items in the subset of items presented. The method further includes the step of utilizing the rating information input by the survey participant to affect the probability of selection of the items in the selected subset in a subsequent selection of a subset of items for presentation to a subsequent survey participant using the predetermined selection algorithm.

In accordance with this second aspect, the rating information is selected from the group comprising: ranking of items relative to each other, ranking of the items on a scale, grading the items, ordering of the items, allocating points among items, scaling the items, choosing an item over other items, categorizing items, and other equivalent methods of indicating a preference of one item over another.

In further accordance with this second aspect, the step of selecting a subset of items in accordance with the predetermined selection algorithm comprises selecting based on a ranking of items using rating information from previous participants, such that the probability of selection of particular items for presenting in a subsequent survey is influenced by the rating information. In this manner, certain items that have been rated lower than other items are more likely to be selected for a survey so as to increase the number of presentations of such items.

In further accordance with this second aspect, the method comprises the step of providing the rating information for each item as an output of the method indicative of survey results.

In the foregoing and most aspects of the invention, the memory is a random access memory array. Information regarding the plurality of items is stored in an ordered array, for example in the memory, and selected according to a probability index. The information about each item in the ordered array is stored in a data field in the ordered array.

In further accordance with the second aspect, the subset of items selected for presentation to the survey participant is an initial subset, and the subsequent selection of a set of items for presentation comprises a selection from the plurality of items that may include one or more of the items from the initial subset.

In further accordance with the second aspect, the information regarding the plurality of items includes a unique identifier for each item for use as a primary key to access the item in the memory.

In further accordance with the second aspect, the method further comprises the step of storing a users item table for storing information provided by a survey participant relating to an additional item for inclusion in the plurality of items.

In accordance with various aspects of the invention, not limited to the first or second, the information regarding the plurality of items includes status information about each item. The status information is indicative whether an item has been previously shown to a survey participant or not. The predetermined selection algorithm also utilizes the status information in conjunction with the frequency information. The frequency information may be stored in a times-shown field for each item in the array.

In further accordance with the second aspect, the predetermined selection algorithm utilizes a selection score in selecting items for presentation. The selection score is based upon a confidence score. The selection score is further based on an adjusted mean rating determined from the rating information. The selection score is further based on a rank influence factor. The rank influence factor is an arbitrary number used to adjust the probability of an item being selected based on ranking information. The ranking information comprises information corresponding to the actual ranking of an item in relation to other items in the plurality of items.

In further accordance with the second aspect, the selection algorithm selects an item from the plurality of items based on a computation of a probability index. The probability index is determined based on a normalized selection score. The normalized selection score is utilized to determine a probability of selection for each item in the plurality of items, the probability of selection of each item is used to determine how many times an item is represented in the plurality of items for selection.

In further accordance with various aspects of the invention, not limited to the first or second aspect, the plurality of items are represented in a computer system as a pool of selectable items stored in an array of items, with each item in the pool having a high index number and a low index number, with the index numbers representing how many times an item is represented in the pool of selectable items, and wherein the step of selecting a subset of items comprises selecting from the pool of items based on a random number used to index into the array of index numbers. The subset of items for presenting to a survey participant is selected by repeating the step of selecting utilizing the random number, until a predetermined number of items corresponding to the size of the selected subset of items has been chosen for presentation.

In further accordance with various aspects of the invention, not limited to the first or second, a selected subset of items comprises a unique sample of items in the plurality of items of a predetermined sample size that meets predetermined selection criteria according to status information associated with the item. The predetermined sample size comprises the maximum number of items presented to a survey participant in the survey. The status information comprises information indicative of a condition associated with an item. The status information may be selected according to various criteria, for example, whether an item is scheduled, whether an item has been approved, whether an item is implemented, whether an item is active, whether an item is in or under review, whether an item has been submitted, whether an item has been declined, or other equivalent information indicative of a condition of an item.

In further accordance with various aspects of the invention, not limited to the first or second, the selected subset of items is selected for presentation based at least in part on an indication of interest of a participant. The indication of interest of a participant is obtained by input of interest information by a survey participant in response to a query prior to selection of the subset. The indication of interest of a participant is obtained by examining items previously submitted by the survey participant, and by selecting other items from the plurality of items based on the topical similarity of other items in the plurality of items. The indication of interest of a participant may be obtained by executing a query of keywords relating to items submitted by the survey participant.

In further accordance with various aspects of the invention, not limited to the first or second, the selected subset of items for presentation is a first selected subset of a predetermined small number of items, where "small" is relative but determined based on a number that is deemed by a survey manager to be acceptable for purposes of a particular survey, and further comprising the step of selecting additional items for presentation to a survey participant. The step of selecting additional items for presentation to a survey participant is based on information provided by a survey participant indicating a desire to view and rate more items. The survey participant is provided with a display offering an opportunity to request an additional sample of items for rating, and wherein the information provided by the survey participant indicating a desire to view and rate more items is input by the survey user interface. The opportunity to request an additional sample of items for rating is typically providing during a survey session.

According to a third aspect, the present invention is a method for conducting a computer-implemented survey of a plurality of items. The invention of this aspect comprises a number of steps that include arranging the plurality of items in a memory in ordered array, providing a unique identifier for each item in the array; providing information about each item in the array for presentation to a survey participant, providing a status information field for each item in the array, providing a times-shown field for each item in the array, selecting a subset of items for presenting to a survey participant in accordance with a predetermined selection algorithm that utilizes the information in the times-shown field of the items, presenting information corresponding to the selected subset of items to the survey participant via a survey user interface, receiving rating information input by the survey participant via the survey user interface indicating the survey participant's preferences as to the subset of items presented, and utilizing the rating information input by the survey participant to affect the probability of selection of the items in the selected subset of times for a subsequent selection of a set of items for presentation to a subsequent survey participant using the predetermined selection algorithm.

According to a fourth aspect, the present invention is a method for conducting a computer-implemented survey relating to a plurality of items from a plurality of survey participants. The invention of this aspect comprises a number of steps that include receiving rating information input by a particular subset of a plurality of survey participants via a survey user interface indicating the survey participants' preferences as to items in a presented subset of items of the plurality of items, computing the mean of the rating information, computing the standard error of the mean of the rating information, determining a confidence score utilizing the standard error of the rating information, and utilizing the confidence score to select a different subset of the plurality of items for presentation to a different subset of the plurality of survey participants. In this manner, items that might benefit from additional ratings by additional participants are selected for presentation in a subsequent survey.

According to a fifth aspect, the present invention is a method for dynamically selecting a subset of items from a plurality of items for presentation to a survey participant in a computer-implemented survey relating to the plurality of items. The invention of this aspect comprises a number of steps that include storing rating information input by a plurality of prior survey participants indicating such prior survey participants' preferences as to items in one or more subsets of items presented to such survey participants in a prior survey, determining the number of participants that have previously rated particular items in the plurality of items, determining a measure of agreement by the determined number of participants on the stored rating information of the particular previously rated items in the plurality of items, utilizing the measure of agreement on the ratings of such previously rated particular items to adjust the probability of selection of such previously rated particular items for a subsequent selection, and selecting a subset of items for presentation to the survey participant as a function of the adjusted probability of selection.

In accordance with this and various other aspects of the invention, the measure of agreement comprises the standard deviation of the mean ratings provided by the prior survey participants, or alternatively comprises the average of the mean ratings provided by the prior survey participants.

In accordance with this and various other aspects of the invention, the step of continuously changing the items in the selected subset of items based on a determined measure of agreement on the stored rating information on previously rated items.

According to a sixth aspect, the present invention is a method for dynamically selecting a subset of items from a plurality of items for presentation to a survey participant in a computer-implemented survey relating to the plurality of items. The invention of this aspect comprises a number of steps that include storing rating information input by a plurality of prior survey participants indicating such prior survey participants' preferences as to items in one or more subsets of items presented to such survey participants in a prior survey, determining the number of participants that have previously rated particular items in the plurality of items, determining a measure of agreement by the determined number of participants on the stored rating information of the particular previously rated items in the plurality of items, continuously adjusting the probability of selection of such previously rated particular items for a subsequent selection based on the determined measure of agreement on the stored rating information on previously rated items, and selecting a subset of items for presentation to the survey participant as a function of the adjusted probability of selection.

According to this and various other aspects of the invention, the measure of agreement comprises the standard deviation of the mean ratings provided by the prior survey participants, or the average of the mean ratings provided by the prior survey participants.

This sixth and other aspects of the invention may also include the step of continuously changing the items in the selected subset of items based on the determined measure of agreement on the stored rating information on previously rated items.

According to a seventh aspect, the present invention is a method for conducting a computer-implemented survey relating to a plurality of items from a plurality of survey participants in a manner that survey participants can contribute new items. The invention of this aspect includes a number of steps including storing information regarding the plurality of items in a memory, the stored information including display information about each of the plurality of items for presentation to a survey participant, selecting a subset of items for presenting to a survey participant in accordance with a predetermined selection algorithm, presenting the display information corresponding to the selected subset of items to the survey participant via a survey user interface, receiving rating information input by the survey participant via the survey user interface indicating the survey participant's preferences as to items in the subset of items presented, receiving information input by the survey participant corresponding to an additional item for inclusion in the plurality of items, and selecting a second subset of items from the plurality of items that now includes the additional item for presenting to a subsequent survey participant in accordance with the predetermined selection algorithm.

According to this seventh and various other aspects of the invention, the method may further include the step of utilizing the rating information input by the survey participant to affect the probability of selection of the items in a subsequent selection of a subset of items for presentation to a subsequent survey participant. The information input by the survey participant is provided via an additional item submission user interface.

According to an eighth aspect, the present invention is a method for conducting a computer-implemented survey relating to a plurality of items from a plurality of survey participants, with an adjustment factor applied to the probability of selection. The invention of this aspect comprises a number of steps including storing information regarding the plurality of items in a memory, the stored information including display information about each of the plurality of items for presentation to a survey participant, conducting a selection operation involving selecting a subset of items for presenting to a survey participant in accordance with a function that utilizes a probability of selection, presenting the display information corresponding to the selected subset of items to the survey participant via a survey user interface, receiving rating information input by the survey participant via the survey user interface indicating the survey participant's preferences as to items in the subset of items presented, determining an adjustment factor for the probability of selection of items in the subset of items as a function of the number of times that the items have already been selected and presented to previous survey participants; and applying the adjustment factor to the probability of selection for a subsequent selection operation.

According to a ninth aspect, the present invention is a method for conducting a computer-implemented survey relating to a plurality of items from a plurality of survey participants, wherein the selection of items is influenced by an adjustment factor derived from previous ratings. The invention of this aspect comprises a number of steps that include storing information regarding the plurality of items, the stored information including display information about each of the plurality of items for presentation to a survey participant, conducting a selection operation involving selecting a subset of items for presenting to a survey participant in accordance with a function that utilizes a probability of selection, presenting the display information corresponding to the selected subset of items to the survey participant via a survey user interface, receiving rating information input by the survey participant via the survey user interface indicating the survey participant's preferences as to items in the subset of items presented, determining an adjustment factor for the probability of selection of items in the subset of items as a function of the rating information on items that have already been selected and presented to previous survey participants; and applying the adjustment factor to the probability of selection for a subsequent selection operation.

According to a tenth aspect, the present invention is a method for conducting a computer-implemented survey relating to a plurality of items from a plurality of survey participants, having a transitional selection process. The invention of this aspect comprises a number of steps including storing information regarding the plurality of items, the stored information including display information about each of the plurality of items for presentation to a survey participant, conducting a selection operation involving selecting a subset of items for presenting to a survey participant in accordance with a function that utilizes a probability of selection, the selection operation initially operative to select a subset of items on random basis, presenting the display information corresponding to the selected subset of items to the survey participant via a survey user interface, receiving rating information input by the survey participant via the survey user interface indicating the survey participant's preferences as to items in the subset of items presented; determining an adjustment factor for the probability of selection of items in the subset of items as a function of the rating information on items that have already been selected and presented to previous survey participants and on the number of survey participants that have rated particular items, and applying the adjustment factor to the probability of selection for a subsequent selection operation. In this manner, the probability of each item being selected is continuously adjusted to be less random and more biased toward selection of unrated items and/or infrequently viewed items as items are rated by survey participants and rating information on particular items is collected.

According to an eleventh aspect, the present invention is a method for conducting a computer-implemented survey relating to a plurality of items from a plurality of survey participants, involving defined criteria or predefined attributes for selection of items. The invention of this aspect includes a number of steps including storing information regarding the plurality of items in a memory, the stored information including display information about each of the plurality of items for presentation to a survey participant and predefined attribute information relating to predetermined attributes of each of the plurality of items, conducting a selection operation involving selecting a subset of items for presenting to a survey participant in accordance with a function that utilizes the predefined attribute information, presenting the display information corresponding to the selected subset of items to the survey participant via a survey user interface, and receiving rating information input by the survey participant via the survey user interface indicating the survey participant's preferences as to items in the subset of items presented.

In accordance with this aspect of the invention, the selection operation is further a function of probability of selection of the plurality of items as well as the attribute information. The method may further include steps of determining an adjustment factor for the probability of selection of items in the subset of items as a function of the rating information on items that have already been selected and presented to previous survey participants and on the number of survey participants that have rated particular items, and applying the adjustment factor to the probability of selection for a subsequent selection operation. In this manner, the probability of each item being selected is continuously adjusted to be less random and more biased toward selection of unrated items and/or infrequently viewed items as items are rated by survey participants and rating information on particular items is collected. The attribute information may comprises one or more of the following: a category, originator, priority, purpose, or other types of criteria or attributes.

According to a twelfth aspect, the present invention is a method for conducting a computer-implemented survey relating to a plurality of items from a plurality of survey participants, wherein an indication of participant willingness is utilized. The invention of this aspect comprises a number of steps that include (a) storing information regarding the plurality of items in a memory, the stored information including display information about each of the plurality of items for presentation to a survey participant; (b) conducting a selection operation involving selecting a subset of items for presenting to a survey participant in accordance with a predetermined function; (c) presenting the display information corresponding to the selected subset of items to the survey participant via a survey user interface; (d) receiving rating information input by the survey participant via the survey user interface indicating the survey participant's preferences as to items in the subset of items presented; (e) receiving an indication input by a survey participant of willingness to view and rate additional items; and (f) in response to receipt of the indication input by a survey participant of willingness to view and rate additional items, conducting a subsequent selection operation (b) and repeating the steps (c) through (f).

According to a thirteenth aspect, the present invention is a method for conducting a computer-implemented survey relating to a plurality of items from a plurality of survey participants, wherein a determination that more rating data is needed is made and utilized. The invention of this aspect comprises a number of steps that include storing information regarding the plurality of items in a memory, the stored information including display information about each of the plurality of items for presentation to a survey participant, conducting a selection operation comprising selecting a subset of items for presenting to a survey participant in accordance with a predetermined selection algorithm, presenting the display information corresponding to the selected subset of items to the survey participant via a survey user interface, receiving rating information input by the survey participant via the survey user interface indicating the survey participant's preferences as to items in the subset of items presented, determining that particular item in the plurality of items should be presented more frequently so as to obtain additional rating data; and adjusting a parameter of the predetermined selection algorithm so as to increase the likelihood that the particular item will be selected during a subsequent selection operation for a subsequent survey.

According to this and various other aspects of the invention, the step of adjusting a parameter of the selection algorithm comprise computing a confidence score among two or more items in the plurality of items, comparing the confidence scores, and using the results of the comparison to adjust the probability of selection of a particular item for which additional data is needed. The parameter of the selection algorithm may be adjusted as a function of the number of survey participants that have previously rated the particular item. The parameter of the selection algorithm may be adjusted as a function of the ratings of the particular item by survey participants that have previously rated the particular item.

According to a fourteenth aspect, the present invention is a method for conducting a computer-implemented survey relating to a plurality of items from a plurality of survey participants, wherein a determination that more data is needed for newer items is made and utilized. The invention of this aspect comprises a number of steps that include storing information regarding the plurality of items in a memory, the stored information including display information about each of the plurality of items for presentation to a survey participant, conducting a selection operation comprising selecting a subset of items for presenting to a survey participant in accordance with a predetermined selection algorithm, presenting the display information corresponding to the selected subset of items to the survey participant via a survey user interface, receiving rating information input by the survey participant via the survey user interface indicating the survey participant's preferences as to items in the subset of items presented, determining that a particular item in the plurality of items is relatively newer item than other items in the plurality of items, and adjusting the predetermined selection algorithm so as to increase the likelihood that the relatively newer item will be selected during a subsequent selection operation for a subsequent survey. In this manner, a relatively newer item will be presented more frequently so as to obtain additional survey data for such newer item.

According to this and various other aspects of the invention, the method may further include a step of receiving new item information input by a survey participant corresponding to the submission of a new item for inclusion in the plurality of items for the survey, such that the new item is the relatively newer item. The relatively newer item may be determined according to the time of inclusion of the item in the plurality of items, compared with other items. The relatively newer item may also be determined according to the number of times that the item has been presented in prior surveys. The relatively newer item may also be determined according to the frequency that the item has been presented in prior surveys. It will be appreciated that the "frequency" an item is presented is not the same thing as the number of times an item is presented, for example, a frequency of presentation could be "this item should be presented in 3 out of every 10 surveys," while the number of times presented could merely be an absolute number.

According to a fifteenth aspect, the present invention is a method for conducting a computer-implemented survey relating to a plurality of items from a plurality of survey participants, with random selection of items biased by the need for more data. The invention of this aspect comprises a number of steps that include storing information regarding the plurality of items in a memory, the stored information including display information about each of the plurality of items for presentation to a survey participant and frequency information indicating a number of times that items in the plurality of items have been presented in a survey, biasing the plurality of items as a function of the frequency information in anticipation of a selection operation, conducting a probabilistic selection operation comprising a random selection within the plurality of items to select a subset of items for presenting to a survey participant, presenting the display information corresponding to the selected subset of items to the survey participant via a survey user interface, and receiving rating information input by the survey participant via the survey user interface indicating the survey participant's preferences as to items in the subset of items presented. In this manner, a biased random selection of items to be presented is conducted so as to avoid presenting only newer, less frequently presented items to later survey participants and to ensure presentation of some early ideas to such later survey participants.

According to a sixteenth aspect, the present invention is a method for conducting a computer-implemented survey relating to a plurality of items from a plurality of survey participants so as to favor selection of items with a higher mean rating. The invention of this aspect comprises a number of steps that include storing information regarding the plurality of items, the stored information including display information about each of the plurality of items for presentation to a survey participant, determining a mean rating of items previously presented to survey participants, biasing the plurality of items as a function of the mean rating of items from the mean rating determining step in anticipation of a selection operation, conducting a selection operation involving selecting a subset of items from the plurality of items for presenting to a survey participant in accordance with a predetermined function that utilizes a probability of selection, presenting the display information corresponding to the selected subset of items to a survey participant via a survey user interface, and receiving rating information input by the survey participant via the survey user interface indicating the survey participant's preferences as to items in the subset of items presented. In this manner, a biased random selection of items to be presented is conducted so as to favor selection of items with a higher mean rating.

In accordance with this aspect of the invention in particular, but may also be applicable to other aspects, the biasing step involves application of a rank influence factor (rif) that may be adjusted to increase or decrease the probability of an item being selected based on the ranking of one item in relation to another item.

The computations and selection algorithms provided by the present invention are not dependent on the manner in which the data is presented to the participant. The participant may be asked to express his preference about the items presented using a variety of user interface concepts including rating each item independently, arranging several items in order of preference, or allocating a fixed number of points among the items presented.

These and other objects, features, and advantages of the present invention may be more clearly understood and appreciated from a review of the following detailed description and by reference to the appended drawings and claims.

BRIEF DESCRIPTION OF THE DRAWINGS

FIG. 3 depicts an exemplary user interface for the present invention as implemented on a web page

OBJECTS OF THE INVENTION

Figure 1:
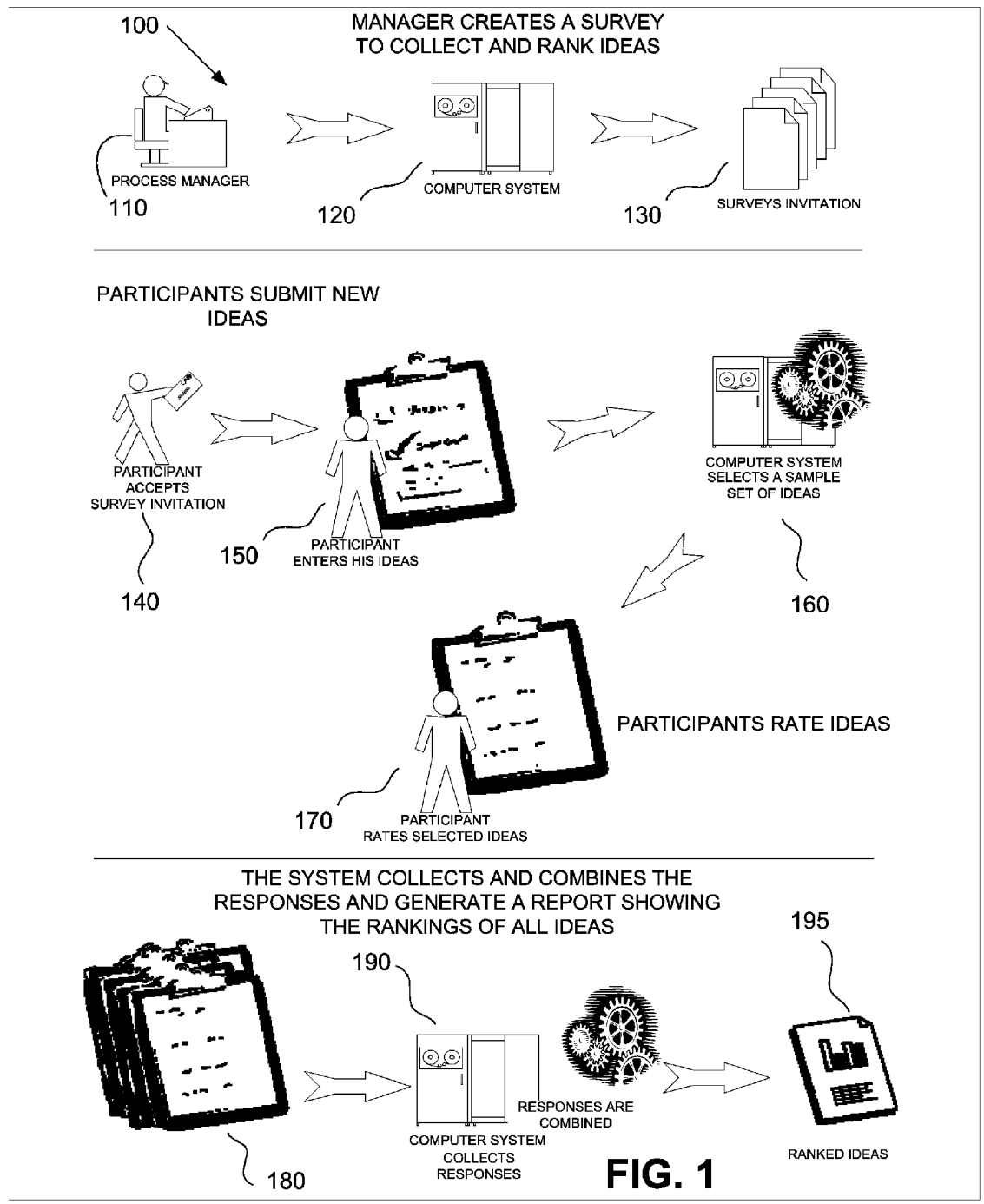
FIG. 1 presents graphical flow of the usage of the present invention.

It is an object of the invention to use statistical methods for the purpose of selecting which items should be presented to a survey participant. Statistical analysis is performed on the already collected responses, if any, to determine which items will be presented to a survey participant.

It is another object of the invention to use the standard error of the mean statistic to determine the confidence level in the mean rating of an item that was presented to subset of the entire population. Then, the confidence level is used to determine which items would benefit from additional ratings by additional participants and should be selected to be rated by future participants.

It is another object of the invention to provide a system that is operative for selecting items to present to a participant dynamically rather than having the questions predetermined at the time the survey is created. This dynamic selection feature is not dependent on how previous questions were answered in the same survey response. Rather, the items are selected for presentation based on how many participants have previously rated each item in the list of items, and how closely those participants agree on the ratings to each item.

It is a further object of the invention to provide a system in which participants in a survey can contribute items to the list of items such that the contributed items are available for presentation to future participants in the same survey.

It is a further object of the invention to use an adjustment factor to cause items in the database to be selected more or less often depending on the number of times the items have already been selected and presented to previous participants.

It is a further object of the invention to use an adjustment factor to cause items to be selected more or less often based on the ranking obtained from previous participants of a survey.

It is a further object of the invention to use a random selection of items to be presented to participants of a survey.

It is a further object of the invention to use a self-adjusting selection process based on previous responses during the same survey. The process is self-adjusting in that the subset of items to be presented to a participant is selected based on all previous responses, and the probability of each item in the database being selected is automatically adjusted as new items are collected and previous items are rated by survey participants.

It is a further object of the invention to provide a system that is operative for making a continuous transition from random selection of items to intelligent selection of items. Items are randomly selected when the survey process begins because no data is available for any of the items. As the process continues, the probability of each item being selected is continuously adjusted to a more intelligent selection as items are rated by participants and response data is collected. The transition from random to intelligent selection is a continuous process, rather than a process where at some point in time or maturity of the survey, the selection becomes more intelligent.

It is a further object of the invention to provide a system that is operative for enabling survey participants to return to the survey and change their original responses, submit new items, and rate new items that have been collected since the time of their previous response to the survey.

It is a further object of the invention to provide a system operative for selecting items to present to survey participants based on criteria defined by the administrator. The criteria may include attributes of the items, such as category, originator, priority, purpose, or any other attributes that may be tracked by an administrator for each item collected in maintained in the database.

It is a further object of the invention to provide a system operative for enabling a participant of a survey who is willing to rate more than the sample set of items to view and rate additional items.

It is a further object of the invention to provide a system operative for selecting items to present to a participant of a survey that are known to be of interest to the participant. The determination of what is known to be of interest can be made by the administrator's specification of selection criteria for particular groups of respondents. Alternatively, items that have words similar to the words used by the participant may be selected for presentation to the participant.

It is yet a further object of the present invention to provide a system operative for enabling survey participants to add comments to items that will be viewed by other survey participants during the course of the survey.

DETAILED DESCRIPTION OF THE INVENTION

I. Introduction

The present invention is generally directed to a computer-implemented system for estimating the preference of a list of items as perceived by a population of participants without having each participant rate each item available. The system may be implemented using a variety of computer technologies including, but not limited to, the internet, World Wide Web, email, client-server, and distributed systems.

The system of the present invention encourages participation by limiting the number of items that each participant will rate, thereby reducing the amount of time needed to complete the survey. The system uses statistics to select the items for which a low statistical confidence has been reached relative to other items. The items that have a low confidence level are those that have not been sufficiently rated, or that have been rated several times and have received inconsistent responses.

The system of the present invention may be used for numerous applications, including consumer research, employee evaluations, human resources, information systems planning, and architectural planning. Further, although items are described herein, it should be understood that the system of the present invention may be used to rank product concepts, people in an organization, or any other item that may be beneficially ordered by participant preference.

II. System Overview

FIG. 1 presents graphical flow of the usage of the present invention. A process manager 110, serves as the administrator and overseer of the processes and systems afforded by the present invention. The process manager 110 interacts with a computer system 120 to create an electronic survey and sends electronic invitations 130 via email to the prospective participants of the survey.

Participants 140 interact with the computer system 120 and are allowed to input items 150 to the database of items 500 as specified in the present invention. The computer system 160 executing programs that are implementing the algorithms and methods in accordance with the present invention will then select a subset of items to be presented to, and rated by the participant 170.

The responses 180 that are received electronically from the participants are then collected by the computer system 190 executing the programs that are implementing the algorithms and methods in accordance with the present invention. The responses 180 are processed by the computer 195 to produce reports of ranked items. The responses 180 are also processed in accordance with the present invention to adjust the selection probabilities of the plurality of items so future participants are presented with the items that are in most need of additional data to improve the confidence in the accumulated mean rating.

Figure 2:
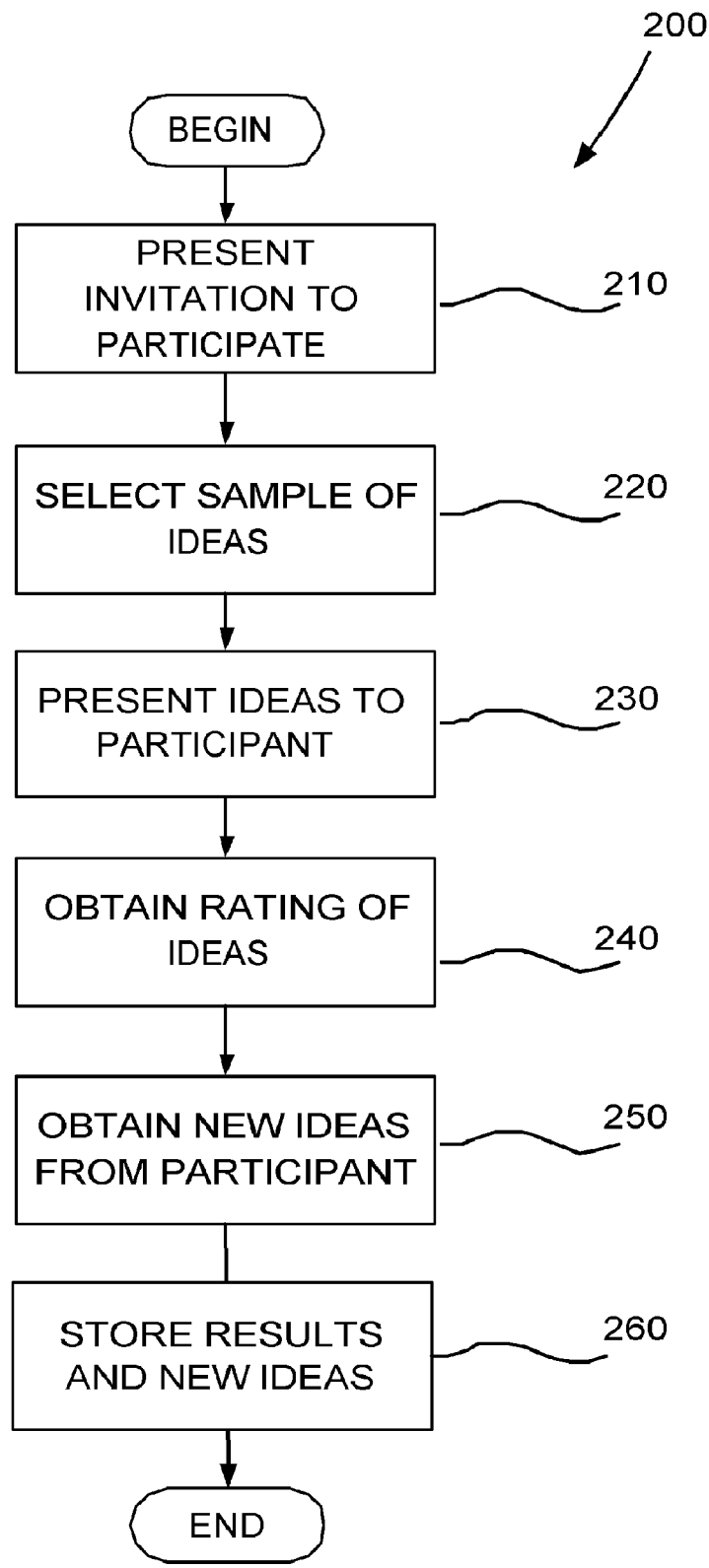
FIG. 2 presents a flowchart of the usage and processes of a typical session of a participant's interaction with the present invention.

FIG. 2 presents a general overview of the system of the present invention. First at 210, a participant is presented with an invitation to participate in a survey. If the participant consents to participating in a survey, the system selects a sample of items from the database 220 and presents the items to the participant 230. The participant rates the items according to the participant's preference 240. The participant is also able to rate items that the participant generates and inputs into the survey 250. When the participant indicates that the rating is complete, the results of the survey, including the new items, are stored in a database 260.

FIG. 3 depicts an exemplary user interface for the present invention as implemented on a web page. In this example, each participant is presented with a graphical user interface which contains a section to allow the participant to submit a new item 310. A sampling of items 320 from the plurality of items stored in the database are selected in accordance with the present invention. The participant is allowed rate 330 each item and submit the results so that they may be stored and used to further adjust the sample selection so that future participants will get a set of ideas where more data is needed.

Figure 4:
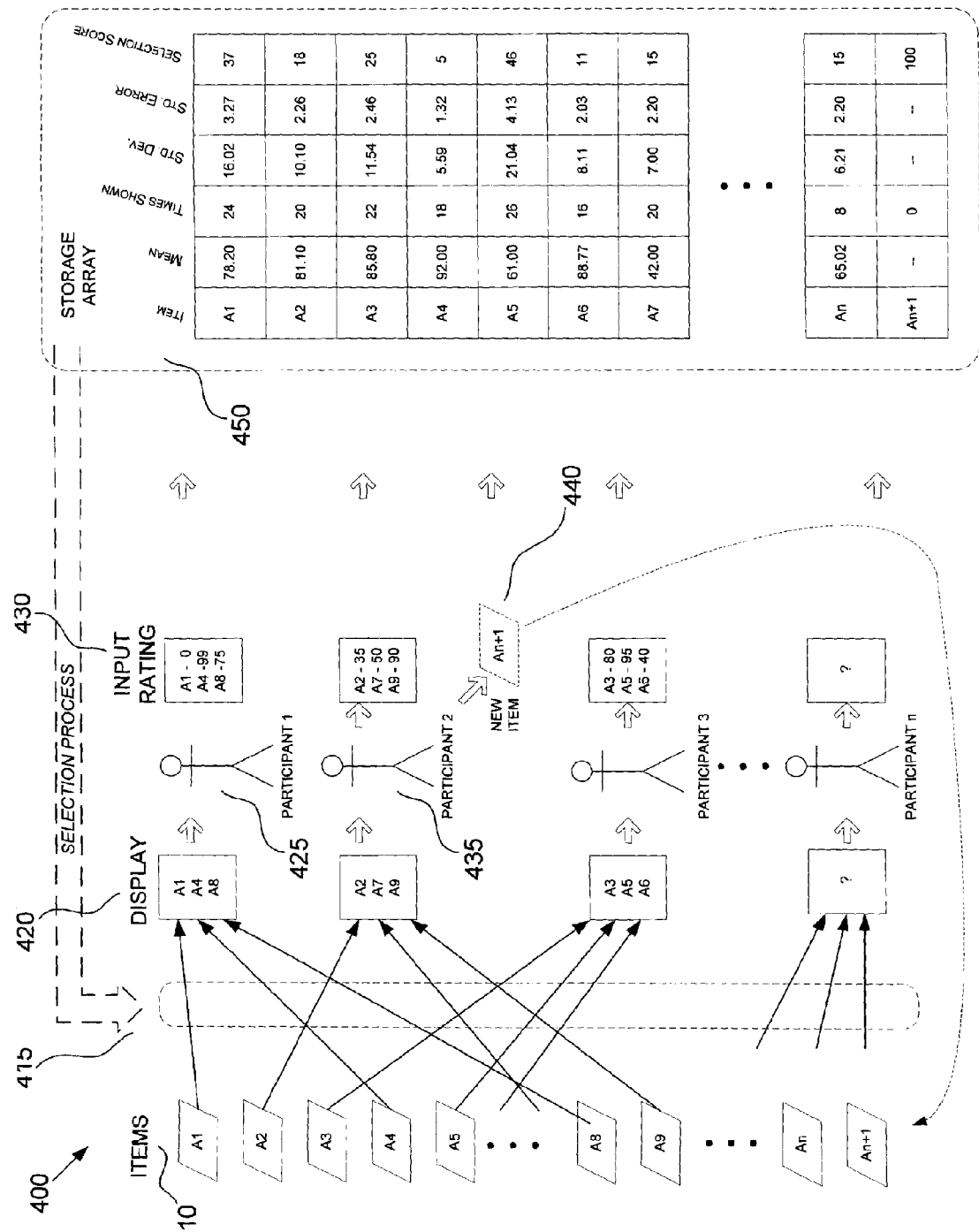
FIG. 4 presents an overview of the process of selecting items, presenting them to participants, and obtaining and recording ratings for the items presented in accordance with the present invention.

FIG. 4 presents an overview of the process of selecting items, presenting them to participants, and obtaining and recording ratings for the items presented in accordance with the present invention. A plurality of items 410 are stored in a storage array 450, either in memory or in a database. This invention provides a selection process 415 which is used to select a subset of the plurality of items 420 to be presented to the participants 425. Each participant 425 and 435 are allowed to specify a rating for each item presented 430. The ratings 430 are then stored in the storage array 450 where the selection process 415 will then compute selection values as specified in the present invention so that the items can be selected for presentation to future participants. Some of the participants may also choose to input a new item 440, which is then incorporated into the storage array 450 and included in the selection process for subsequent participants.

Figure 5:
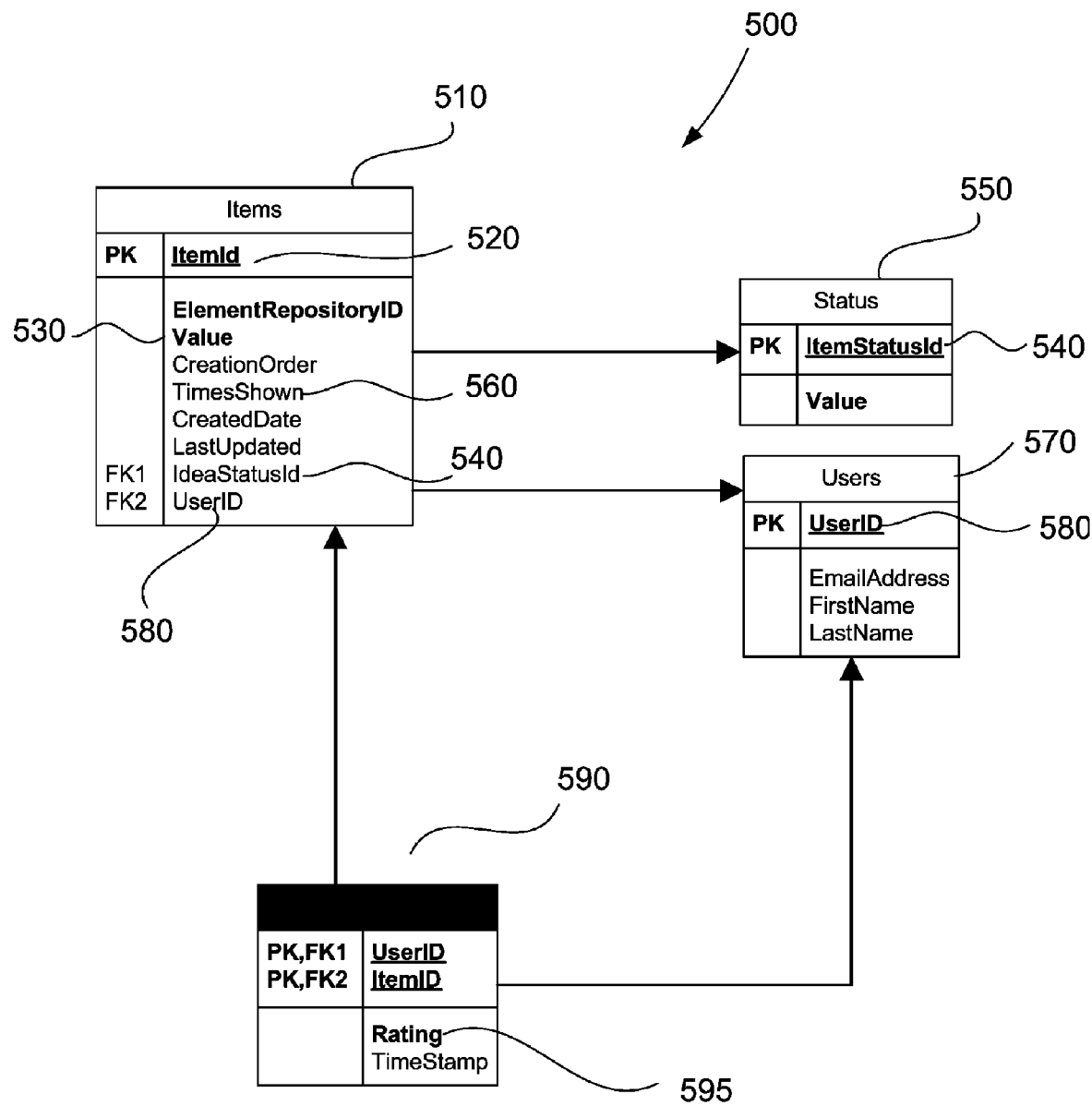
FIG. 5 depicts an exemplary database structure that may be used in accordance with the present invention.

FIG. 5 depicts an exemplary database structure 500 that may be used in accordance with the present invention. Each item or item is stored in an item table 510, which contains basic information about the item. Each item is identified by a unique identifier 520, in this instance named "ItemId". The ItemId is a reference number that is used as the primary key for each item table 510. The "Value" field 530 contains the actual text of the item itself. Each item also contains a status field 540, in this instance named "ItemStatusID", which may optionally be stored in a separate table 550. The status 540 is used as part of the criteria for determining if an item is eligible for selection, as will be described in detail below.

The "TimesShown" field 560 is used in the computation of the confidence value for each item. The confidence value relates to the number of times an item has been presented to participants, and will be discussed in greater detail below.

When a participant inputs an item, the participant information may be stored in a different table, such as a "Users" table 570. This enables efficient storage of participant information, particularly where a given participant submits more than one item. Each item has a "UserID" field 580 that uniquely identifies a participant record in the users table.

During the process of executing this invention, each participant is presented a subset of the plurality of items to rate. The ratings submitted by each participant are stored in a response rating field 595. One row is added to the response table 590 for each item that is selected for a participant during the execution of this invention. Each row in the response table is initialized with a rating of zero. Once the participant actually rates an item, then the response table rating field 595 is updated with the actual value for that item as set by the participant.

Figure 6:
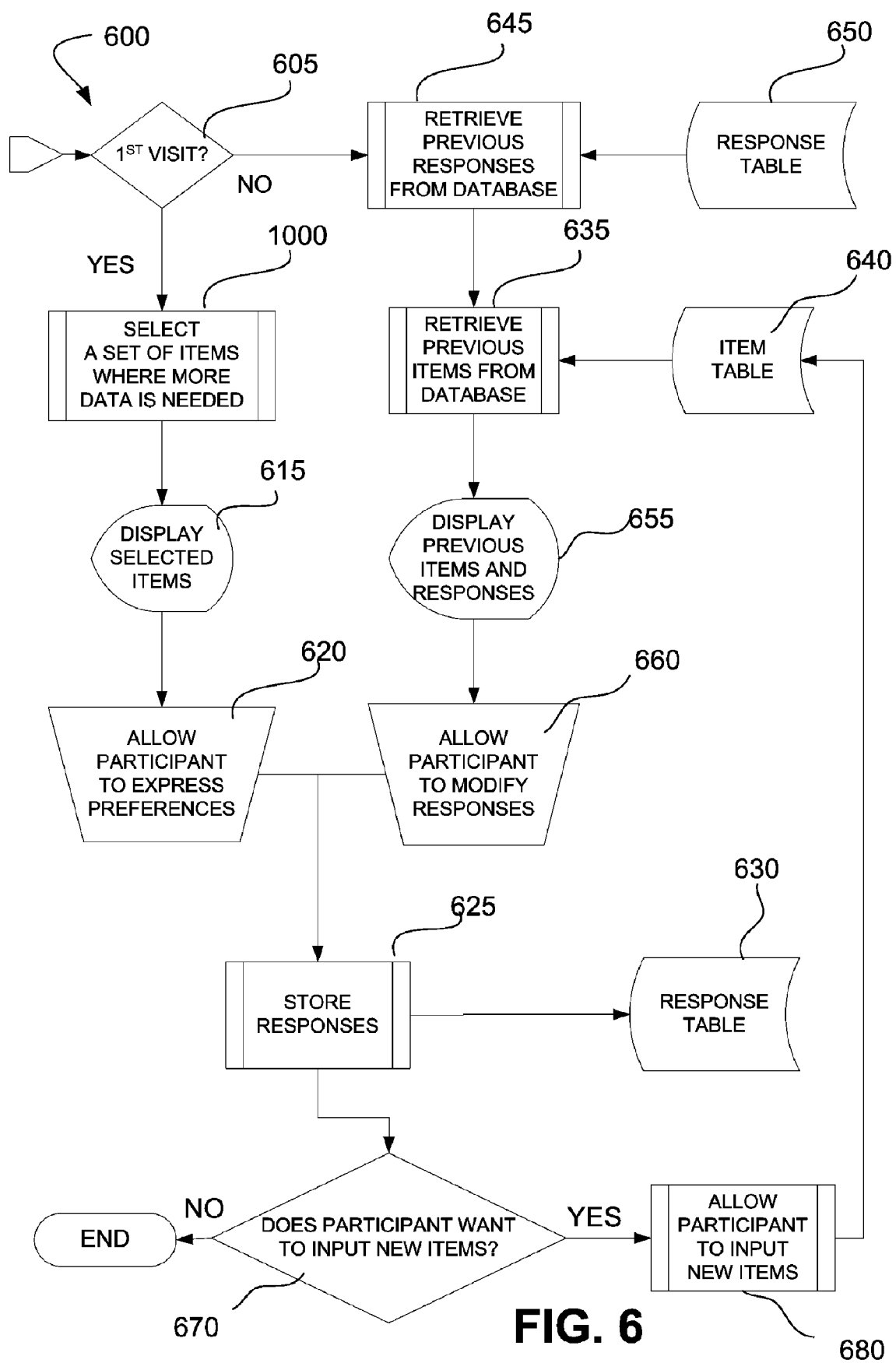
FIG. 6 presents an overview of the item selection process according to the present invention.

The response table 590 is also used to determine if the participant is returning to survey as depicted in FIG. 6, box 645; in which case the survey participant will be presented with the same set of items that were previously selected for the participant.

It should be noted that the system of the present invention does not depend on the mechanism by which the items are placed in the database. Thus, various database designs and storage mechanisms may be used as desired. Such designs and mechanism are well known by those skilled in the art and are not described herein.

An overview of the item selection process 600 is presented in FIG. 6. The system first determines whether the participant is visiting the site for the first time 605 by performing a query to the database to see if a response has already been received for the participant (by userid). If the participant is visiting the site for the first time, a set of items is selected 1000 and presented to the user 615. An item is selected for presentation to a participant if a statistical analysis of the data associated with the item indicates that more data is needed to improve the statistical level of certainty, or "confidence level" relative to the other items in the database. The confidence level will be increased for an item when more participants have rated an item or when the participants who have rated the item increasingly agree on the level of desirability or rating of the item. As such, there is no particular threshold or other absolute value to determine when enough participants have rated an item or when the participants who have rated an item agree enough.

Instead, a confidence score is computed for each item, as will be discussed in connection with FIGS. 6-10. The confidence scores are used only to compare the level of confidence among two or more items to determine which items are most needing additional data. The items that have the lower confidence scores are the items that could benefit the most from additional ratings by participants. For example, if an item has been rated by many participants and the ratings mostly agree, the item would have a higher confidence score than an item that has only been rated by a few participants or that has been rated vastly differently.

After the items are selected 1000 and presented 615, the participant may express his or her preferences for the various items presented 620. The selection process 1000 is described in detail in Para 108 and FIG. 10. Additionally, the participant may be afforded the opportunity to input one or more additional items, which are also rated by the participant. The responses are then stored 625 and entered into a response table 630. Participants are allowed to input new items as shown in 670 and 680. FIG. 6 illustrates a participant's ability to input a new item after rating existing items. The inputting of new items could also occur before the participant has rated items. In either case, each item input by a participant is stored in the item table 640 where it is available to be presented to another participant. Thus, an item input by one participant may be rated by one or many other participants.

The participants who are rating items may optionally return to the system at any time during the course of the survey program and participate again. When a participant returns to the system for a second or subsequent visit, the items previously evaluated by the participant are retrieved 635 from the item table 640. Likewise, the participant's previous responses are retrieved 645 from the response table 650 using the UserId created. The previous items and responses are then displayed 655. The participant is then able to modify the responses if desired 660. The responses are then stored 625 and entered in the response table 630. The new data is used in all subsequent computations of confidence factors.

III. Determining the Selection Score for Each Item

The selection score for an item determines the desired probability that it will be selected by future participants. There are several intermediate computations need to arrive at the selection score. This section describes how the response data from participants who have already rated an item are used to compute the intermediate values and ultimately the selection score.

First a mean of the responses is computed, and then an estimate of the standard deviation of the mean is computed. Once the standard deviation of the mean value is available, the standard error of the mean can be computed. The standard error of the mean is then translated to a confidence factor which is a representation of the amount of confidence we have in the accuracy of the previously accumulated responses on a scale of one to one hundred.

Before the confidence factor is used to compute a selection score, two additional factors are used to give the administrator of the system additional control over which items should be preferred for selection. The participation influence factor is an arbitrary number, specified by the administrator, which controls the amount of weight to be given to the count of the number of people who responded. The rank influence factor is an arbitrary number, specified by the administrator, which allows higher ranked items to have greater preference in the selection process.

A. Calculation of the Confidence Factor

Figure 7:
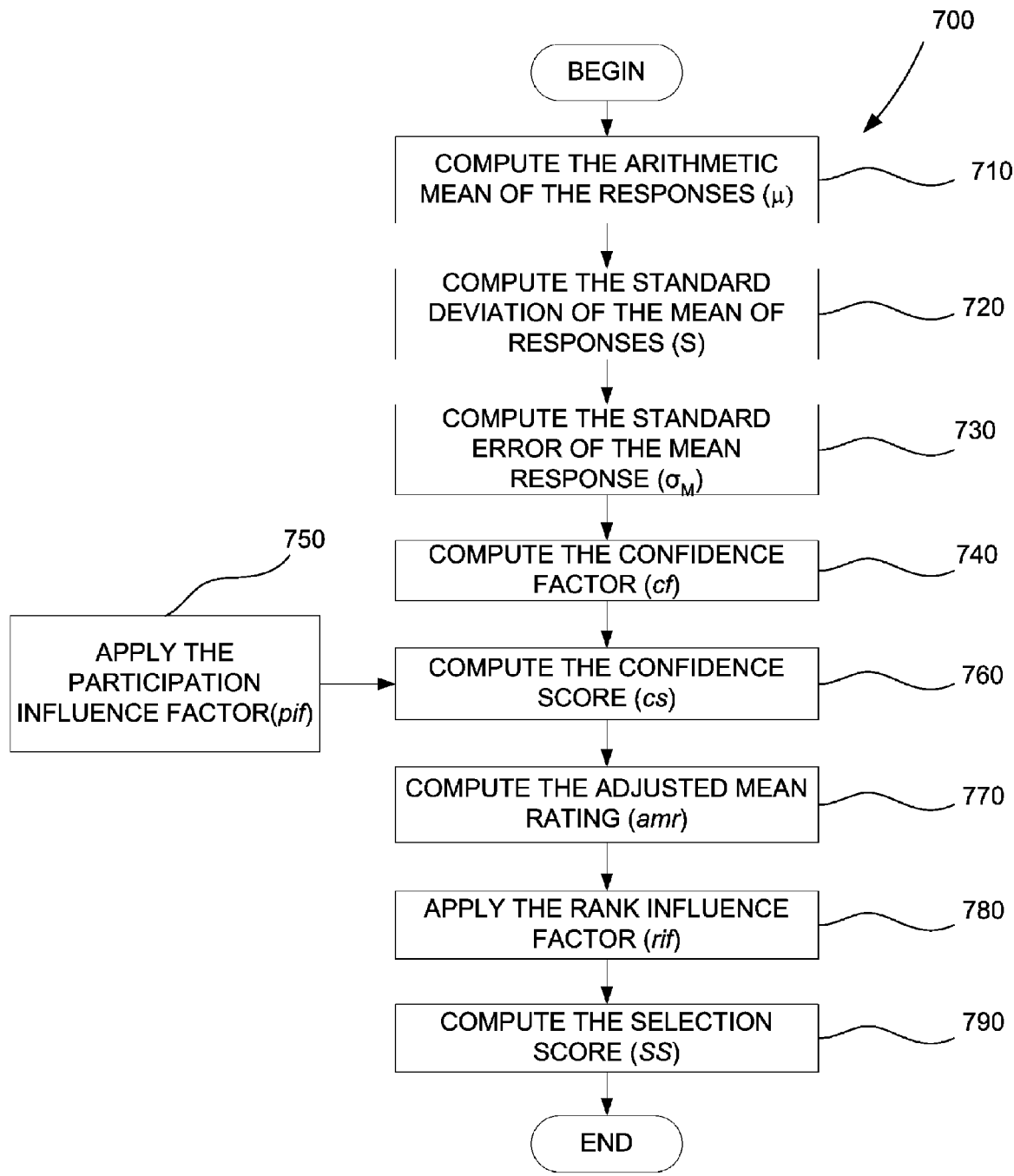
FIG. 7 presents an overview of the process for calculating the selection score of each item.

FIG. 7 presents an overview 700 of the process for calculating the selection score of each item. As stated above, the selection score is used to determine whether a particular item will be selected for presentation to a participant. First, an arithmetic mean (µ) is calculated for the responses already collected for the item 710. The arithmetic mean of the rating values is referred to as the "mean rating value". The mean rating value provides a consolidated rating for all participants who rated the element. A mean rating value is not calculated until there are at least two responses ranking the item. The mean rating is calculated as follows:

$$\mu = \frac{X_1 + X_2 + X_3 + \ldots + X_n}{n}$$

where X is the rating value and n is the number of times the item has been rated.

As data is collected over time, a "rolling" mean rating (µ') is calculated using the previous mean rating (µ'), the new rating value (Xn), and the number of times (n) this item has been rated as follows:

$$\mu' = \frac{\mu(n-1) + X_n}{n}$$

Next at 720, the statistical standard deviation (s) of the mean rating is calculated. The standard deviation of the mean rating represents the amount of agreement or disagreement among the population of participants who rated the item. The standard deviation is calculated using the "nonbiased" or "n−1" method. Although only a subset of the entire population of participants actually rated the item, this method estimates the standard deviation for the entire population.

$$s = \sqrt{\frac{n\sum x^2 - (\sum x)^2}{n(n-1)}}$$

Next, the standard error of the mean response is computed 730. The standard error is calculated from the estimated standard deviation of the mean calculated above and the number of responses included in the computation of the mean as follows.

$$\sigma_M = \frac{s}{\sqrt{n}}$$

where s is the estimated standard deviation of the mean rating and n is the number of times the item has been presented for evaluation. As can be readily seen from the equation set forth above, the number of participants responding to each item, and the degree to which they agree or disagree determines confidence level in the data for a given item. As the standard deviation decreases, the standard error also decreases.

The standard error will have a value between 0 and the maximum rating value of the item, inclusive. The maximum rating value may vary for each survey application as desired. Thus, for example, if the item can be given a rating from 1 to 5, the maximum standard error will be 5. The items with the highest standard error are preferred in the selection process because more data is needed to increase the level of certainty in the preference ranking. As the number of data points for an item increases, the standard error of the data collected for the item decreases. As the standard error of the data for an item decreases, the confidence in the mean rating increases and the data collected more accurately estimates the statistical parameter of the population.

Next, a confidence factor (cf) is calculated for the item 740. The system always computes a confidence factor for each item regardless of how many items are stored in the item database at the time of the computation. The confidence factor is used to measure the need to obtain additional data for each item relative to the need to collect additional data for all other items. When items are selected to be presented, the items with the lowest confidence levels are preferred for selection.

The confidence factor is calculated using the standard error of the mean response and the maximum possible rating value for each item as follows:

$$cf = 100 - \frac{100\sigma_M}{M}$$

where M is the maximum possible rating value of the item. The confidence factor (cf) has a value between 0 and 100. A confidence factor of 100 indicates maximum confidence in the mean rating value for an element. Theoretically, this is only achievable if an item is rated by each participant in the population, and each participant provides the same rating for the item.

A confidence factor is calculated for an item when as few as two responses are collected for the item. For items with less than two responses, the confidence factor is set to 0, which causes them to be favored for selection over the items that have at least two responses. Once an item has received two responses, the probability of selection is computed relative to all other items in the database. As additional items are added, the confidence factors are recomputed for all items.

According to the present invention, items that are added to the database during the survey process are given the opportunity to achieve fair rankings quickly with minimal bias or skewing of the data. A low confidence factor will be computed for later arriving items because they have fewer respondents, thereby causing the newer items to be selected more frequently than earlier arriving items. The newer items will be selected more frequently until the confidence in the data collected for the newer items gains equality with the earlier items. As such, the system of the present invention provides a significant advantage over traditional survey methods in which new items are always at a disadvantage over items that were in the database from the beginning of the process. In such traditional systems, a set of items must be compiled before the process begins, and if new items are collected after the process begins, the new items must wait for a second survey.

B. Use of the Participation Influence Factor to Influence the Confidence Score Still viewing FIG. 7, according to another aspect of the present invention, the system administrator may specify an additional factor 750 that will cause the number of participants rating an item to have more influence in the confidence score than would otherwise be computed using the confidence factor alone. This additional factor is called the "participation factor" (pf).

The participation factor is calculated using the number of times the item was presented and the total number of times all items were presented as follows:

$$pf = \frac{N}{P} \times cf$$

where N is the number of times the item was presented, and P is the total number of presentations of all items.

A "participation influence factor" (pif) may be used to control the degree to which the participation factor influences the confidence score. The participation influence factor can be adjusted to give more or less weight to the number of participants who responded. When the participation influence factor is adjusted to a high value, the number of people who have provided preference data for an item becomes the dominant factor in the computation of confidence in the data collected for that item. Also, when the participation influence factor is adjusted to a high value, the standard deviation, or amount of agreement among the people who have provided preference data, becomes less of a factor in the computation of the confidence in the collected data for the item. The participation influence factor can be adjusted to a neutral position, which causes the confidence factor to be computed using only the generally accepted calculation for standard error.

To control the degree to which the participation factor influences the confidence score, an additional factor is introduced. This "adjusted participation factor" (apf) is calculated as follows.

$$apf = \frac{N}{P} \times cf \times pif$$

As is readily observed, if the participation influence factor is set to 0, the adjusted participation factor will be 0 and have no influence on the confidence score.

C. Calculation of the Confidence Score

Next, the confidence score (cs) for a particular item is computed 760. The confidence score is a measure of the relative amount of confidence in the statistical mean rating calculated from the data provided by the participants who rated the element. It should be noted that the confidence score cannot be computed until at least two participants have rated an element. The confidence score is calculated for each element as follows:

Cs=cf+apf

The system of the present invention does not use the confidence score to determine an absolute selection order. Rather, it uses the confidence score adjust the probability that each item will be selected. This will cause some items that already have a higher confidence factor in the data collected to be selected and presented to participants along with the newer items with lower confidence in the data. Without this probabilistic approach, it would be likely that newer items would be selected and presented only to newer participants and existing items would only be selected for rating by early participants. Thus, the present invention enables a more random selection of items to be presented, while showing items that need additional data more frequently.

D. Use of Adjusted Mean Rating and the Rank Influence Factor to Influence the Confidence Score In some instances, it might be desirable to favor the selection of items with a higher mean rating over items with a lower mean rating. For instance, there may be a situation in which there is a greater need for certainty about the order of preference of high ranking items, and there is little or no concern about the order of preference of low ranking items. By way of specific example, a survey may be initiated to identify items in which to invest resources in. In such an example, there would be little interest in low ranking items because such items will not be considered. However, if the objective is to rank employees for the purpose of terminating the lower ranks, the need for confidence in the lower rankings is equally as important as the higher rankings.

In either of such instances, the system still uses the confidence score computed above to determine which elements need more data. However, the use of the adjusted mean rating (amr) and rank influence factor (rif) enable the accumulated mean rating of an element to have a controlled amount of influence on its selection score.

First, according to one aspect of the present invention, the ratings for a set of items may be rescaled between the minimum and maximum ratings to more clearly discern the order of preference between the items 770. The rescaled mean rating is called the "adjusted mean rating". The adjusted mean rating (amr) is computed as follows:

$$amr = \frac{100 \times (R_{max} - R_{min})}{\mu}$$

where $R_{max}$ is the maximum rating that was given to the items in the repository, and $R_{min}$ is the minimum rating that was given to the items in the repository.

Second, according to yet another aspect of the present invention, the amount of influence that the adjusted mean rating has on the selection score may be controlled by applying an externally controlled factor called the "rank influence factor" 780. The rank influence factor (rif) may be adjusted to increase or decrease the probability of an item being selected to be presented to a participant based on the actual ranking of the item in relation to the other items. If the rank influence factor is set to a high value, items with a higher current ranking are more likely to be selected. If the rank influence factor is set to 0, the adjusted mean rating will have no influence on the selection score, as will be described in detail below.

E. Calculation of the Selection Score

Finally, the selection score (SS) is calculated 790 as follows to determine which items should be preferred in the selection process:

$$SS = cs - \frac{rif \times amr \times cs}{10000}$$

The selection score is calculated for each item in the item database. The items that will be selected are those with the lowest scores, as will be described in further detail below.

IV. The Item Selection Process

A. Overview

After a selection score is computed for each item, the desired probability that a given item will be presented is computed. Specifically, the selection score calculated above determines the probability that an item will be selected and, therefore, the frequency at which it will be presented to participants.

For purposes of explanation only, the selection process may be compared to placing numbered balls in a barrel and randomly drawing balls out of the barrel. For instance, if 100 balls, each having a unique number between 1 and 100 are placed in the barrel, each has a 1% chance of being drawn from the barrel. To increase the probability of a number being selected, more balls with the same number are placed into the barrel. Instead, if there were 100 balls in a barrel and 30 of them are numbered "12", a random selection from the barrel would effect a 30% chance of drawing a ball with the number 12 on it.

According to one aspect of the present invention, no assumptions are made about the number of responses that will be ultimately received for a given item. Instead, the system of the present invention selects the best sample set based on information available at the time of selection. Likewise, the total number of responses that will be collected for the set of items or for any particular item is unknown at any time during the process. Thus, the system of the present invention uses the number of responses already collected when computing the confidence factor and selection probabilities. Sample selections are made based on probabilities that were computed just prior to the selection and the items that are in most need of additional data at that time are the most likely to be selected for the sample.

B. Calculation of the Probability Index

Figure 8:
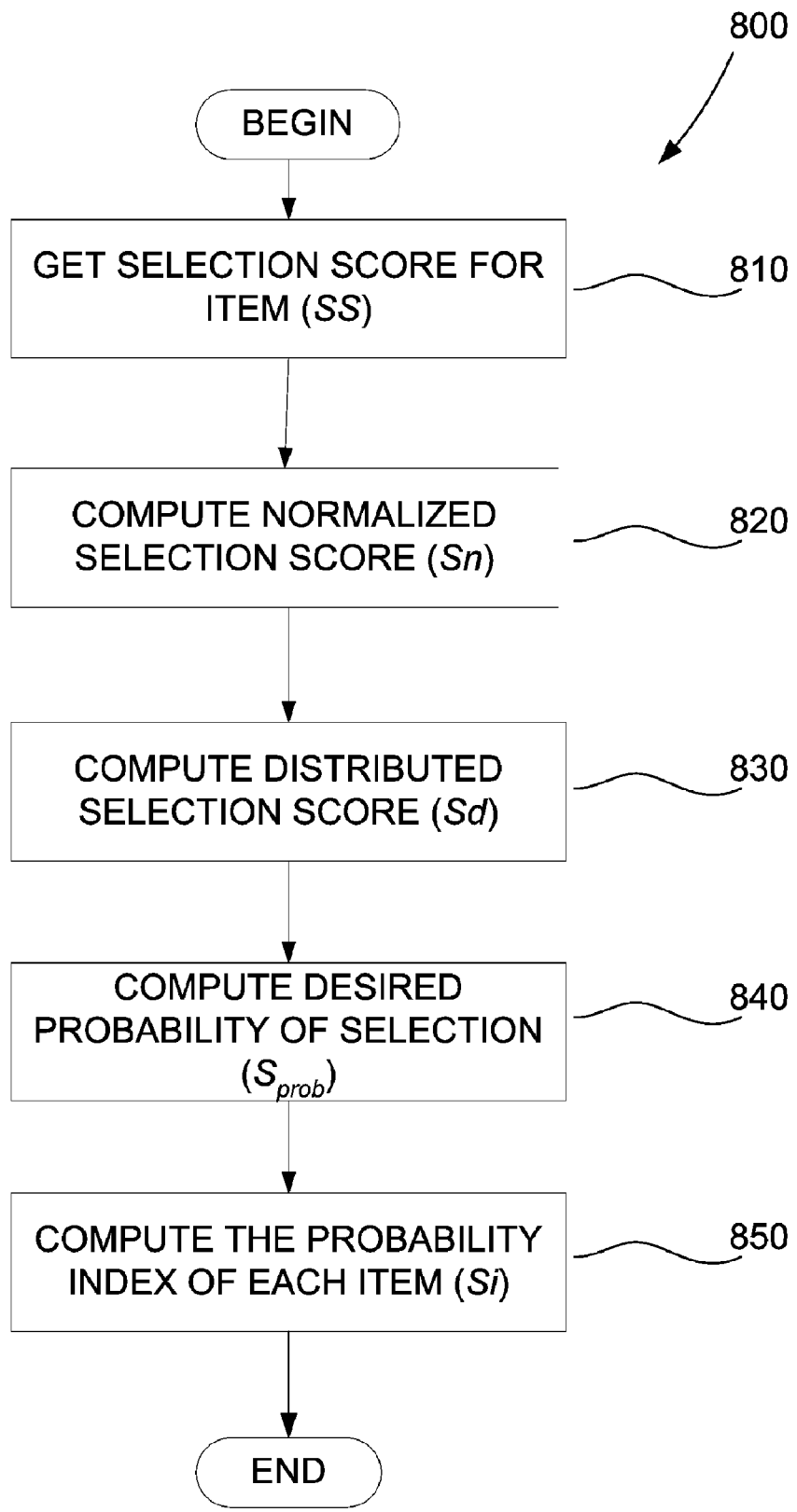
FIG. 8 presents an overview of the process for computing a probability index for each item in accordance with the present invention.

FIG. 8 presents an overview of the process for computing a probability index for each item in accordance with the present invention.

First, using the selection score calculated above 810, a normalized score (Sn) is computed 820 for each item as follows:

$$Sn = 100\left(1 - \frac{SS}{\sum SS}\right)$$

The normalized score has a value between 1 and 100. As the value approaches 100, the probability of selection of the item increases.

If the sum of the selection scores is zero, then the normalized score is set to 100. The sum of the selection scores will be zero when none or the items have been rated, or when all ratings are zero. In either instance, the normalized score for each and every item will be set at a value of 100, thereby providing each item an equal opportunity to be selected for presentation to a participant.

In many instances, the normalized score is concentrated around a relatively small number of scores, e.g. between 90 and 100. In this instance, a distributed score (Sd) may be calculated 830 for each item across a range of values from 1 to 100 as follows:

$$Sd = 100 \frac{Sn - Sn_{min} + 1}{Sn_{max} - Sn_{min}}$$

It should be noted that if Sn max is equal to Sn min then all items have the same rating. This could occur when none of the items have been rated or when all items have the same mean rating. In either case, the distributed score for each and every item is set to 100, thereby making each item equally available for selection.

The desired probability of selection ($S_{prob}$) is then computed 840 for each item as follows:

$$S_{prob} = \frac{Sd}{\sum Sd}$$

The probability of selection of each item is then multiplied by the size of the item selection pool, as defined by the administrator or manager of the system, to determine how many times the item should be represented in the set. This value, called the "probability index" (Si), is calculated 850 as follows:

$$Si = S_{prob} \times PoolSize$$

A selection pool size of at least 1000 is recommended to avoid excessive rounding error that could skew the results. However, the actual pool size may be increased if the number of items is expected to be greater than 1000. After the pool is created and each item is represented in the pool the number times as indicated by its probability index value, a random selection of items from the pool will yield the desired results.

C. Representation of the Pool of Items

Figure 9:
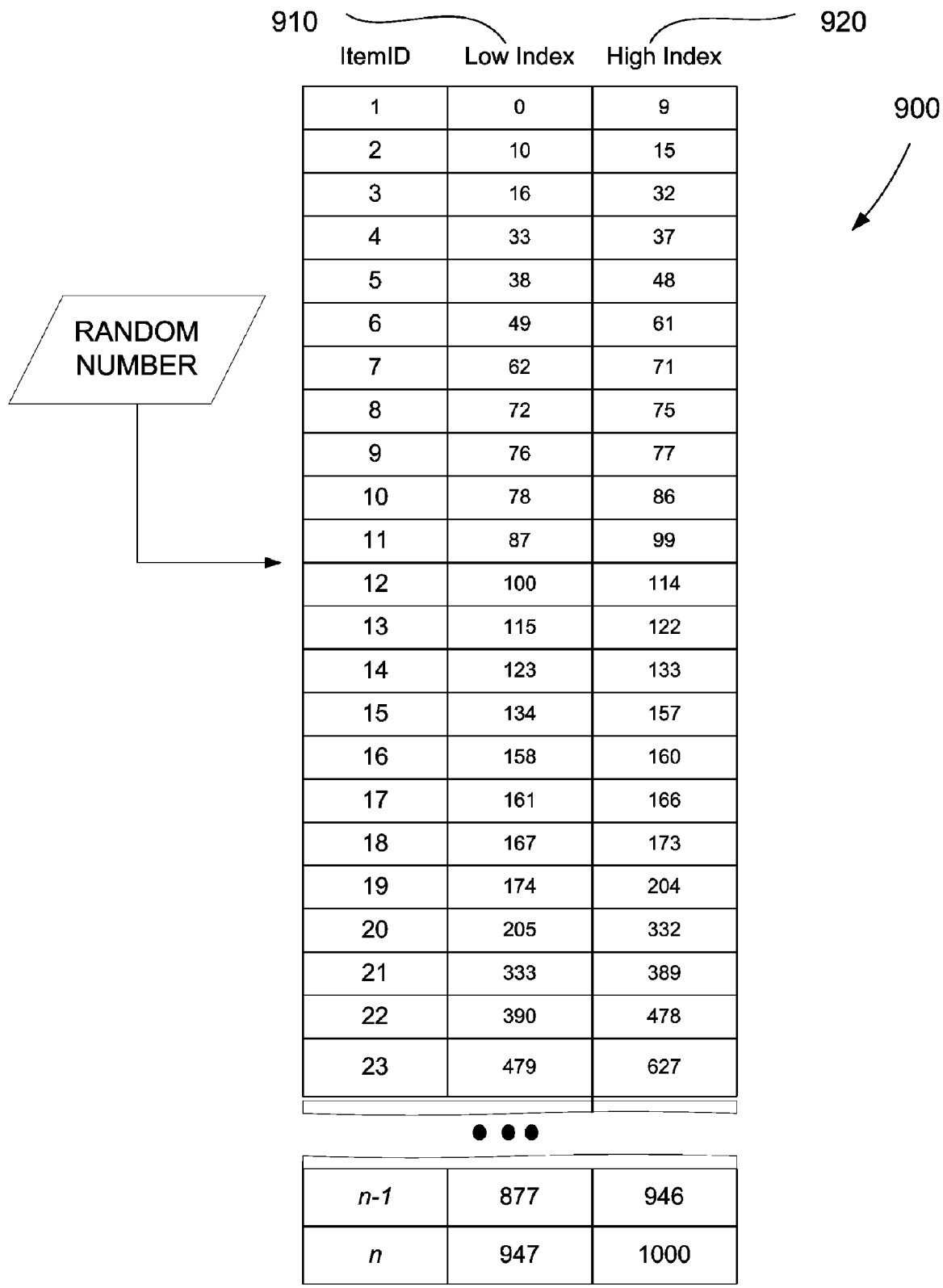
FIG. 9 depicts an exemplary two dimensional array that may be used in accordance with the present invention to represent the resulting pool of items.

Turning to FIG. 9, a two dimensional array 900 may be used in accordance with the present invention to represent the resulting pool of items. The array 900 contains one row for each item. Each item in the table includes a low index number 910 and a high index number 920. These index numbers represent how many times each item is represented in the pool. For example if an item had a low index value of 10 and a high index value of 15, the item would be represented six times in the pool. The table could be compressed even further by only storing the high index. By storing the low index and the high index for each item the desired selections can be efficiently processed by obtaining a random number then using the following SQL Select statement: SELECT TOP 1 ITEM FROM POOLARRAY WHERE RANDOM_NUMBER BETWEEN LOW_INDEX and HIGH_INDEX. This statement will select the single item where the random number falls between the low and high indexes for that item.

The process of using a random number to select an item will be repeated enough times to retrieve the desired number of items according to the sample size that is requested. To fill a sample set with the desired number of unique items that all meet predetermined criteria, the logic is somewhat more sophisticated than a simple loop that repeats a fixed number of iterations.

D. Selection of the Sample Set

Figure 10:
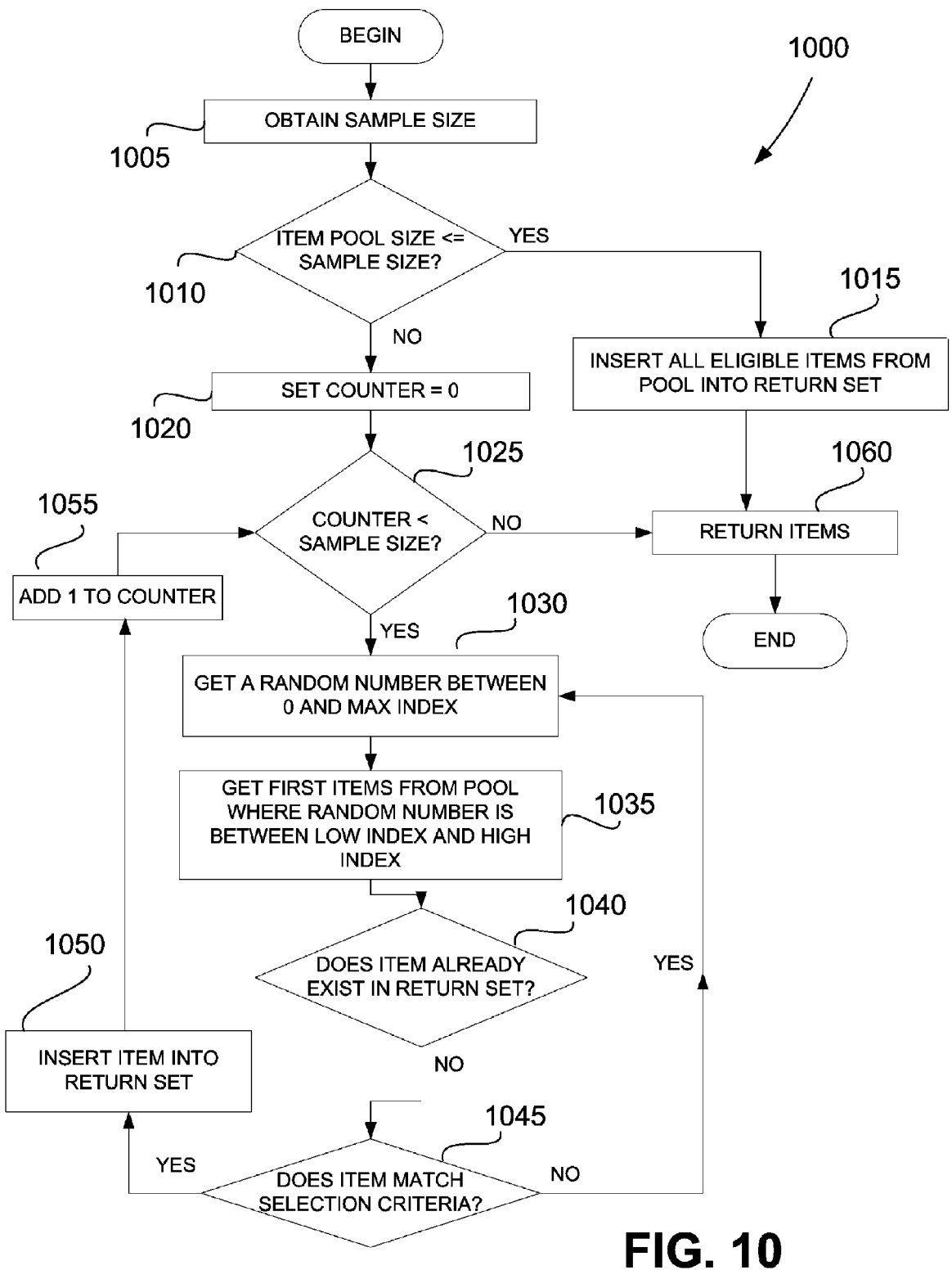
FIG. 10 presents an overview of the logic required to properly select a unique sample set to be presented to a participant.

FIG. 10 presents an overview 1000 of the logic required to properly select a unique sample set having the desired sample size, and in which each item meets the specified selection criteria according the status of the items.

First, the desired sample size is obtained 1005. This is the maximum number of items that will be selected and presented to a participant. The number of items will be equal to the sample size unless the number of items that are available and eligible for selection is less than the sample size. The sample size is a parameter that is specified by the administrator of the system.

Next, the system determines whether the number of items in the database is less than or equal to the sample size 1010. If the number of items in the database is less than the number of items in the sample size, all items that meet the selection criteria are inserted into the sample set 1015.

The selection criteria are specified by the administrator and consist of logical conditions based on the attributes of each item. For example, only items in an "active" status may be eligible for selection. Items in a "declined" status would not meet the selection criteria. Various conditions may be specified by the system administrator as desired. If the status or attributes of an item change during the survey process such that the item meets the defined criteria, the item becomes eligible for selection. If the criteria for selection changes during the process, all items that meet the criteria then become eligible for selection. When items become eligible for selection, a confidence factor is computed for the items, and the items are selected as described above.

If the number of items in the database is not less than the number of items in the sample size, the counter is set to a value of 0 and the selection process continues 1020.

Next, if the counter is less than the sample size 1025, a random number between 0 and the maximum probability index value is then generated 1030.

Next, using the random number generated in step 1030, an item is selected from the pool 1035. The item selected has a low index value less than or equal to the random number and a high index value greater than or equal to the random number. If the selection pool table was constructed properly, such as that in FIG. 9, one and only one item will qualify for selection.

Next, still viewing FIG. 10, the item selected above is compared to any items already selected for the sample set 1040. If the item was previously selected for the sample set, the system returns to step 1030 and repeats the process until an item is selected that has not already been selected for this sample set.

Next, the system verifies that the selected item meets any selection criteria specified by the administrator 1045. If the item does not meet the selection criteria, the item will not be made part of the sample set. The process then repeats until items are selected that meet the selection criteria.

Next, the selected item is inserted into the set of items for the sample set 1050. Additionally, a value of 1 is added to the counter for the number of items in the sample set 1055. If the number of items now in the sample set is equal to the desired sample size, the selection of the sample set is complete and the items are displayed to the participant 1060. If not, the process repeats until the desired sample size is attained.

E. Selecting Items within a Participant's Scope of Interest

According to another aspect of the present invention, a set of items may be presented to a participant based on the particular interests of the participant. The various interests of a participant can be determined by the system either statically or dynamically.

To determine a participant's interests statically, the participant is presented with a query about the participant's interests. Then, selection criteria specified by the administrator restrict the number of items that are eligible for presentation to a given participant. These criteria are used during the selection process previously described in connection with in FIG. 10.

Dynamic determination of a participant's interest is conducted by examining the contents of items previously submitted by the same participant, and selecting other items relating to the subject matter submitted. For example, if a participant submits several items related to the topic of "security", the system will select other items related to security for presentation to the participant.

Figure 11:
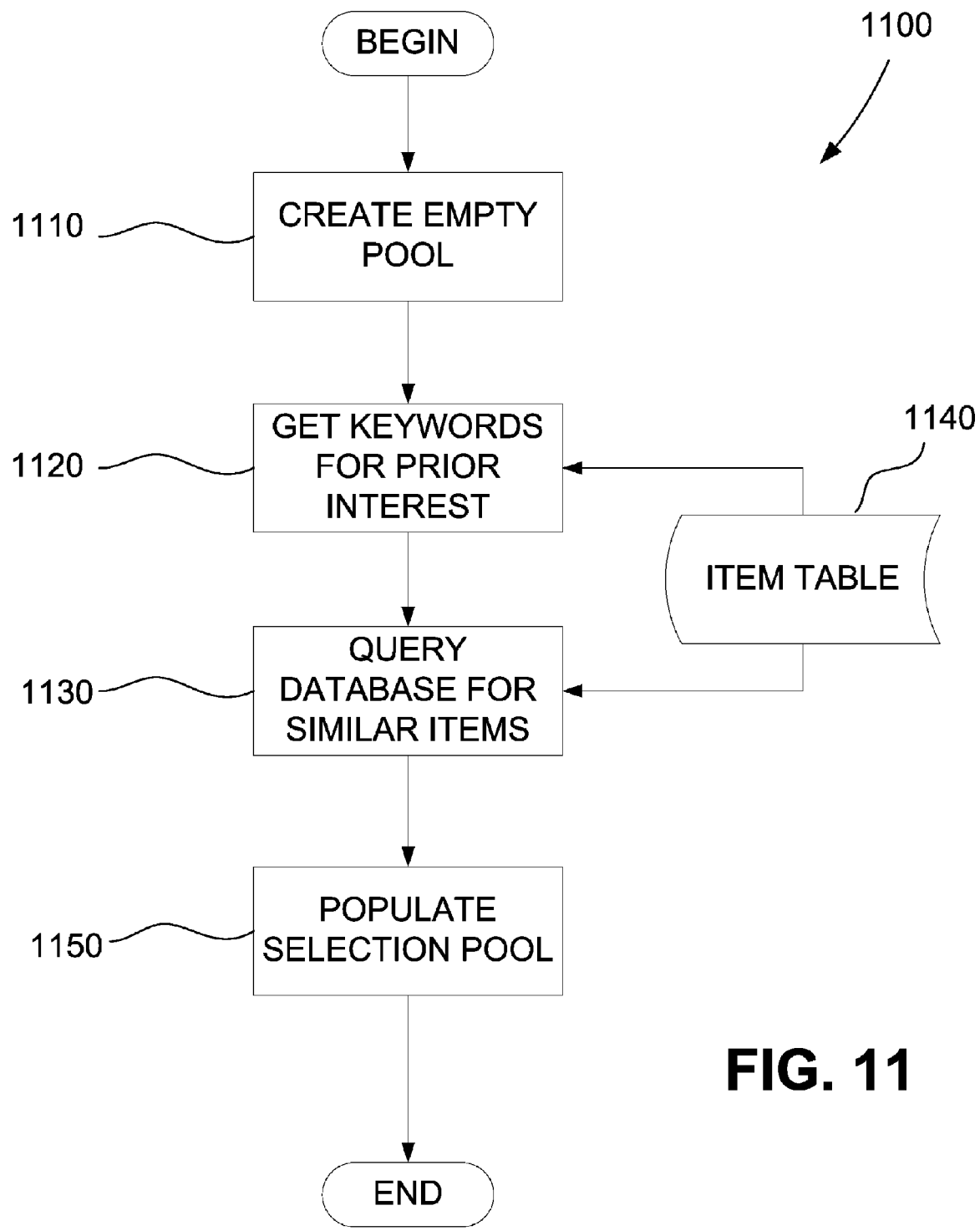
FIG. 11 presents an overview of the process used to dynamically select a sample based on prior interest.

FIG. 11 illustrates the process 1100 used to dynamically select a sample based on prior interest. First, an empty pool of items that are eligible for selection for the participant is created 1110. The pool is then populated with appropriate items, and used as the selection pool in the selection process as previously described in connection with FIG. 10.

After the participant has input the rating information, a query is made to the database of items to determine keywords relating to items that were submitted by the current participant 1120. This query can be adjusted by the administrator to also include items that have been rated by the current participant where the rating value for those items surpasses a specified level. When a participant gives an item a high rating, this can be used as an indication that the participant has interest in the type of item or subject of the item and can therefore be considered a good participant to rate other items of the same or similar type or subject matter.

Each of the items that match the query is used in a similar manner 1130 to find other items in the database 1140 that meet a specified degree of similarity. The results of this search are then used to populate the selection pool 1150, which is then used as the selection pool for the process depicted in FIG. 10.

VI. Allowing Participants to Rate a Variable Number of Items

According to yet another aspect of the present invention, a participant is able to view and rate more items than provided in the subset presented. This provides significant advantages over presently available survey systems, which present too many questions to the participant and risk losing the participant. According to the present invention, a smaller, more reasonably sized, subset of items may be selected for an initial presentation to the participant, who can then choose to view and rate additional items if desired.

Figure 12:
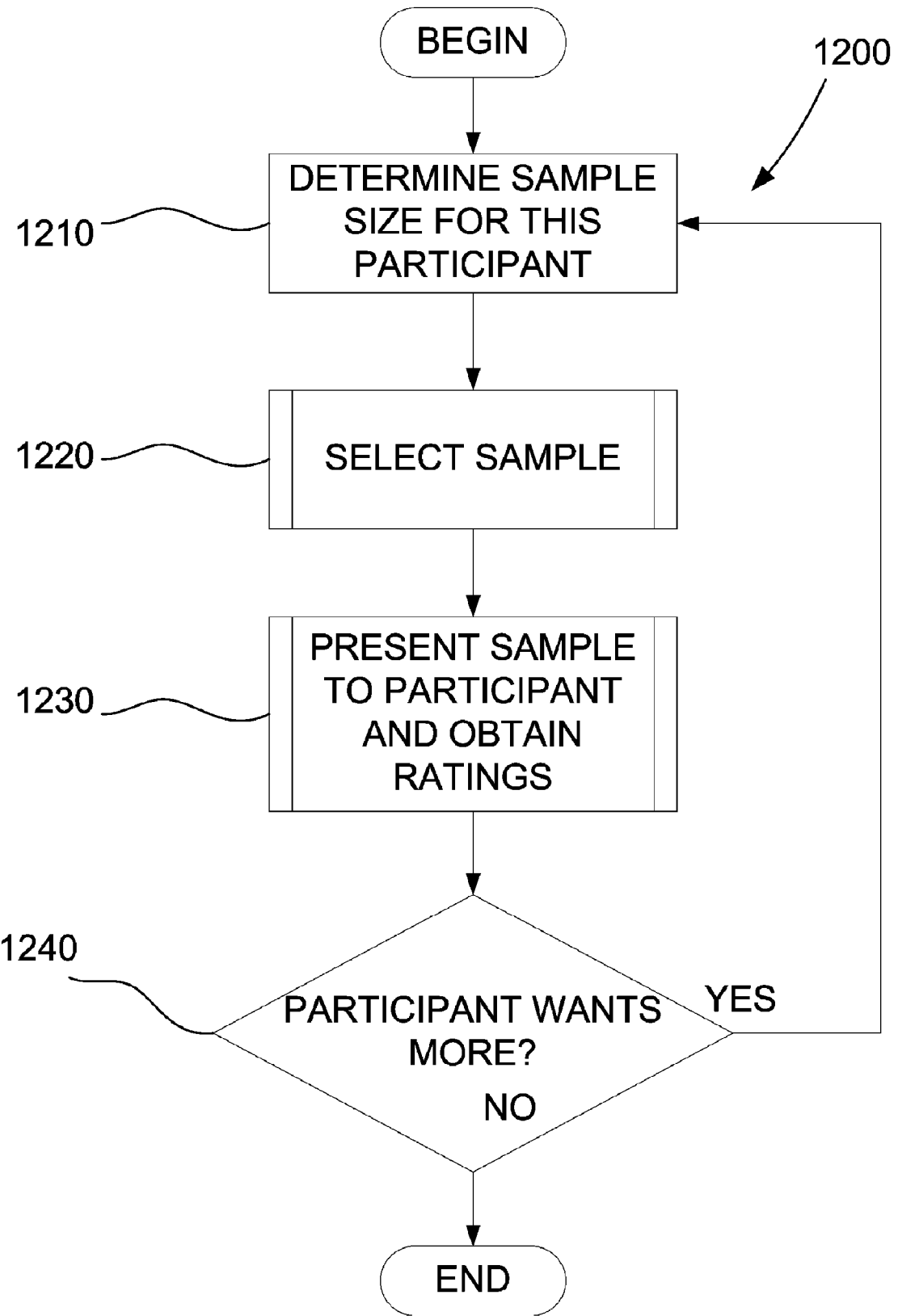
FIG. 12 presents an overview of the logical flow used to allow participants to rate a variable number of items.

FIG. 12 presents an overview 1200 of the logical flow used to allow participants to rate a variable number of items.

First, a sample size for the participant is determined 1210. If desired, the system administrator may allow the participant to choose how many items to view or rate before the process begins. In this case, the participant is simply selecting the sample size. After the sample size is selected 1220, the process continues with items being selected and presented 1230 as described above.

Additionally, the participant may view and rate a set of items, and then choose to view and rate additional items. In this instance, after the participant has rated the first set of items presented, the participant is offered an opportunity to request another sample 1240. The sample size may or may not be fixed, and may be established by the administrator or participant as desired. If the sample size is fixed, the administrator may specify the initial sample size, and the size of any subsequent samples selected for a participant. Likewise, if the sample size is selected by the participant, the administrator may specify the upper and lower limits of the sample size.

It will be understood that the foregoing relates only to the preferred embodiments of the present invention, and that numerous changes may be made therein without departing from the spirit and scope of the invention as defined by the appended claims.

What is claimed is:

1. A method for conducting a computer-implemented survey to collect survey information relating to a plurality of items from a survey participant by the display of information relating to a selected subset of a set of items in the survey to a survey participant via a survey user interface generated by a computer, the selected subset of items selected as a function of the number of times that particular items have been previously shown to other survey participants in one or more prior surveys, comprising the computer-implemented steps of:
    storing information regarding the set of items in a memory, the stored information including (a) display information about each of the plurality of items in the set of items for presentation to a survey participant and (b) presentation number information corresponding to the number of times that each particular item in the set of items has been previously shown to survey participants in one or more prior surveys;
    selecting a subset of items from the set of items for presenting to a survey participant in accordance with a predetermined selection algorithm that utilizes the presentation number information to select items that are in need of additional data to improve a confidence factor relative to other items in the set of items;
    presenting the display information corresponding to the selected subset of items to the survey participant via the survey user interface; and
    receiving rating information input by the survey participant via the survey user interface indicating the survey participant's preferences as to items in the selected subset of items presented.

2. The method of claim 1, further comprising the step of utilizing the rating information input by the survey participant to affect the probability of selection of the items in the selected subset in a subsequent selection of a subset of items for presentation to a subsequent survey participant using the predetermined selection algorithm.

3. The method of claim 1, wherein the predetermined selection algorithm utilizes an adjustment factor to cause items to be selected more or less often as a function of the rating information obtained by previous participants of a survey.

4. The method of claim 1, wherein the predetermined selection algorithm utilizes, at least in part, a random number selection of items in the plurality of items.

5. The method of claim 4, wherein the plurality of items includes a predetermined duplication of items in a set of the plurality of items, with the number of duplications of particular items influenced by the rating information.

6. The method of claim 1, wherein the predetermined selection algorithm is self-adjusting based on previous responses received during a previous survey of the plurality of items.

7. The method of claim 6, wherein the self-adjusting is based on modifying the probability of selecting an item from the plurality of items, the modifying in turn based collection of new items input by survey participants and rating of new items in comparison of previously included items.

8. The method of claim 1, wherein the predetermined selection algorithm is operative initially to randomly select items for the subset of items, and thereafter operative to select items based on utilization of the rating information.

9. The method of claim 8, wherein the probability of selection of a given item is continuously adjusted as items are rated by survey participants.

10. A method for conducting a computer-implemented survey to collect survey information relating to a plurality of items from a survey participant by the display of information relating to a selected subset of a set of items in the survey to a survey participant via a survey user interface generated by a computer, the selected subset of items selected as a function of the number of times that particular items have been previously shown to other survey participants in one or more prior surveys, comprising the computer-implemented steps of:
    storing information regarding the set of items in a memory, the stored information including (a) display information about each of the plurality of items for presentation to a survey participant and (b) frequency of display information corresponding to the number of times that each particular item in the set of items has been previously shown to survey participants in one or more prior surveys;
    selecting a subset of items from the set of items for presenting to a survey participant in accordance with a predetermined selection algorithm that utilizes the frequency information to select items that are in need of additional data to improve a confidence factor relative to other items in the set of items;
    presenting the display information corresponding to the selected subset of items to the survey participant via the survey user interface;
    receiving rating information input by the survey participant via the survey user interface indicating the survey participant's preferences as to items in the selected subset of items presented; and
    utilizing the rating information input by the survey participant to affect the probability of selection of items in the set of items for a subsequent selection of a subset of items for presentation to a subsequent survey participant using the predetermined selection algorithm.

11. The method of claim 10, wherein the rating information is selected from the group comprising: ranking of items relative to each other, ranking of the items on a scale, grading the items, ordering of the items, allocating points among items, scaling the items, choosing an item over other items, categorizing items, and other equivalent methods of indicating a preference of one item over another.

12. The method of claim 10, wherein the step of selecting a subset of items in accordance with the predetermined selection algorithm comprises selecting based on a ranking of items using rating information from previous participants, such that the probability of selection of particular items for presenting in a subsequent survey is influenced by the rating information, whereby certain items that have been rated lower than other items are more likely to be selected for a survey so as to increase the number of presentations of such items.

13. The method of claim 10, further comprising the step of providing the rating information for each item as an output of the method indicative of survey results.

14. The method of claim 10, wherein the memory is a random access memory array.

15. The method of claim 10, wherein information regarding the plurality of items is stored in an ordered array and selected according to a probability index.

16. The method of claim 15, wherein the information about each item in the ordered array is stored in a data field in the ordered array.

17. The method of claim 10, wherein the subset of items selected for presentation to the survey participant is an initial subset, and wherein the subsequent selection of a set of items for presentation comprises a selection from the plurality of items that may include one or more of the items from the initial subset.

18. The method of claim 10, wherein the information regarding the plurality of items includes a unique identifier for each item for use as a primary key to access the item in the memory.

19. The method of claim 10, further comprising the step of storing a users item table for storing information provided by a survey participant relating to an additional item for inclusion in the plurality of items.

20. The method of claim 10, wherein the information regarding the plurality of items includes status information about each item.

21. The method of claim 20, wherein the status information is indicative whether an item has been previously shown to a survey participant or not.

22. The method of claim 21, wherein the predetermined selection algorithm also utilizes the status information in conjunction with the frequency information.

23. The method of claim 10, wherein the frequency information is stored in a times-shown field for each item in the array.

24. The method of claim 10, wherein the predetermined selection algorithm utilizes a selection score in selecting items for presentation.

25. The method of claim 24, wherein the selection score is based upon a confidence score.

26. The method of claim 25, wherein the selection score is further based on an adjusted mean rating determined from the rating information.

27. The method of claim 25, wherein the selection score is further based on a rank influence factor.

28. The method of claim 27, wherein the rank influence factor is an arbitrary number used to adjust the probability of an item being selected based on ranking information.

29. The method of claim 28, wherein the ranking information comprises information corresponding to the actual ranking of an item in relation to other items in the plurality of items.

30. The method of claim 10, wherein the selection algorithm selects an item from the plurality of items based on a computation of a probability index.

31. The method of claim 30, wherein the probability index is determined based on a normalized selection score.

32. The method of claim 31, wherein the normalized selection score is utilized to determine a probability of selection for each item in the plurality of items, the probability of selection of each item is used to determine how many times an item is represented in the plurality of items for selection.

33. The method of claim 10, wherein the plurality of items are represented in a computer system as a pool of selectable items stored in an array of items, with each item in the pool having a high index number and a low index number, with the index numbers representing how many times an item is represented in the pool of selectable items, and wherein the step of selecting a subset of items comprises selecting from the pool of items based on a random number used to index into the array of index numbers.

34. The method of claim 33, wherein the subset of items for presenting to a survey participant is selected by repeating the step of selecting utilizing the random number, until a predetermined number of items corresponding to the size of the selected subset of items has been chosen for presentation.

35. The method of claim 10, wherein a selected subset of items comprises a unique sample of items in the plurality of items of a predetermined sample size that meets predetermined selection criteria according to status information associated with the item.

36. The method of claim 35, wherein the predetermined sample size comprises the maximum number of items presented to a survey participant in the survey.

37. The method of claim 35, wherein the status information comprises information indicative of a condition associated with an item.

38. The method of claim 10, wherein the status information is selected from the group comprising: whether an item is scheduled, whether an item has been approved, whether an item is implemented, whether an item is active, whether an item is in or under review, whether an item has been submitted, whether an item has been declined, or other equivalent information indicative of a condition of an item.

39. The method of claim 10, wherein the selected subset of items is selected for presentation based at least in part on an indication of interest of a participant.

40. The method of claim 39, wherein the indication of interest of a participant is obtained by input of interest information by a survey participant in response to a query prior to selection of the subset.

41. The method of claim 39, wherein the indication of interest of a participant is obtained by examining items previously submitted by the survey participant, and by selecting other items from the plurality of items based on the topical similarity of other items in the plurality of items.

42. The method of claim 39, wherein the indication of interest of a participant is obtained by executing a query of keywords relating to items submitted by the survey participant.

43. The method of claim 10, wherein the selected subset of items for presentation is a first selected subset of a predetermined small number of items, where "small" is relative but determined based on a number that is deemed by a survey manager to be acceptable for purposes of a particular survey, and further comprising the step of selecting additional items for presentation to a survey participant.

44. The method of claim 43, wherein the step of selecting additional items for presentation to a survey participant is based on information provided by a survey participant indicating a desire to view and rate more items.

45. The method of claim 44, wherein the survey participant is provided with a display offering an opportunity to request an additional sample of items for rating, and wherein the information provided by the survey participant indicating a desire to view and rate more items is input by the survey user interface.

46. The method of claim 45, wherein the opportunity to request an additional sample of items for rating is providing during a survey session.

47. A method for conducting a computer-implemented survey to collect survey information relating to a plurality of items from a survey participant by the display of information relating to a selected subset of a set items in the survey to a survey participant via a survey user interface generated by a computer, the selected subset of items selected as a function of the number of times that particular items have been previously shown to other survey participants in one or more prior surveys, comprising the computer-implemented steps of:
- arranging information relating to the set of items in a memory as entries in an ordered array;
- providing a unique identifier for each entry in the array;
- providing display information about each item in the array entry for presentation to a survey participant;
- providing a status information field for each item in the array;
- providing a times-shown field for each item in the array;
- selecting a subset of items from the set of items for presenting to a survey participant in accordance with a predetermined selection algorithm that utilizes the information in the times-shown field of the items in the set of items to select items that are in need of additional data to improve a confidence factor relative to other items in the set of items;
- presenting the display information corresponding to the selected subset of items to the survey participant via the survey user interface;
- receiving rating information input by the survey participant via the survey user interface indicating the survey participant's preferences as to items in the subset of items presented; and
- utilizing the rating information input by the survey participant to affect the probability of selection of the items in the selected subset of items for a subsequent selection of a subset of items for presentation to a subsequent survey participant using the predetermined selection algorithm.

48. A method for conducting a computer-implemented survey to collect survey information relating to a set of items from a plurality of survey participants by the display of information relating to items in the survey to a survey participant via a survey user interface generated by a computer, comprising the computer-implemented steps of:
- storing information regarding each item in the set of items in a memory, the stored information including display information about each item in the set of items for presentation to a survey participant via the survey user interface;
- conducting a selection operation involving selecting a first subset of items for presenting to a survey participant in accordance with a function that utilizes a probability of selection;
- presenting the display information corresponding to the selected first subset of items to the survey participant via the survey user interface;
- receiving rating information input by the survey participant via the survey user interface indicating the survey participant's preferences as to items in the first subset of items presented;
- determining an adjustment factor for the probability of selection of items for a subset of items as a function of the number of times that the items have previously been selected and presented to previous survey participants; and
- applying the adjustment factor to the probability of selection for a subsequent selection operation for selecting a second subset of items for a subsequent survey.

49. A method for conducting a computer-implemented survey to collect survey information relating to a set of items from a survey participant by the display of information relating to a selected subset of the set of items in the survey to a survey participant via a survey user interface generated by a computer, comprising the computer-implemented steps of:
- storing information regarding each item in the set of items in a memory, the stored information including display information about each items in the set of items for presentation to a survey participant via the survey user interface and frequency information indicating a number of times that each item in the set of items has been presented in a survey;
- biasing the set of items as a function of the frequency information in anticipation of a selection operation;
- conducting a probabilistic selection operation comprising a random selection within the set of items to select a first subset of items for presenting to a survey participant;
- presenting the display information corresponding to the selected first subset of items to the survey participant via the survey user interface; and
- receiving rating information input by the survey participant via the survey user interface indicating the survey participant's preferences as to items in the first subset of items presented,
- whereby a biased random selection of items to be presented to the survey participant is conducted so as to avoid presenting only newer, less frequently presented items to later survey participants and to ensure presentation of some earlier items to such later survey participants.

* * * * *